US012625222B2

(12) United States Patent
Manolakos et al.

(10) Patent No.: US 12,625,222 B2
(45) Date of Patent: May 12, 2026

(54) MAPPING OF REFERENCE SIGNAL MEASUREMENTS TO ANGLES OF DEPARTURE

(71) Applicant: QUALCOMM Incorporated, San Diego, CA (US)

(72) Inventors: Alexandros Manolakos, Escondido, CA (US); Weimin Duan, San Diego, CA (US); Jay Kumar Sundararajan, San Diego, CA (US); Naga Bhushan, San Diego, CA (US); Krishna Kiran Mukkavilli, San Diego, CA (US); Tingfang Ji, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/260,903

(22) PCT Filed: Dec. 1, 2021

(86) PCT No.: PCT/US2021/072672
§ 371 (c)(1),
(2) Date: Jul. 10, 2023

(87) PCT Pub. No.: WO2022/169532
PCT Pub. Date: Aug. 11, 2022

(65) Prior Publication Data
US 2024/0061069 A1     Feb. 22, 2024

(30) Foreign Application Priority Data
Feb. 8, 2021     (GR) .............................. 20210100083

(51) Int. Cl.
*G01S 5/02*          (2010.01)
*H04B 7/0456*     (2017.01)
(Continued)

(52) U.S. Cl.
CPC ........ *G01S 5/0268* (2013.01); *G01S 5/02526* (2020.05); *H04B 7/0456* (2013.01); *H04B 7/0639* (2013.01); *H04B 17/252* (2023.05)

(58) Field of Classification Search
CPC .............. G01S 5/0268; G01S 5/02526; H04B 7/0456; H04B 7/0639; H04B 17/252;
(Continued)

(56) References Cited

U.S. PATENT DOCUMENTS

2019/0199935 A1     6/2019 Danielsen et al.
2020/0137714 A1*    4/2020 Kumar ................ H04W 72/542
(Continued)

FOREIGN PATENT DOCUMENTS

JP          2008139292 A     6/2008
JP          2017044501 A     3/2017

OTHER PUBLICATIONS

Huawei, et al., "Discussion on DL-AoD Positioning Procedure", 3GPP TSG-RAN WG2 Meeting #109, R2-2000969, 3rd Generation Partnership Project, Mobile Competence Centre, 650, Route Des Lucioles, F-06921 Sophia-Antipolis Cedex, France, vol. RAN WG2, No. Electronic, Feb. 24, 2020-Mar. 6, 2020, Feb. 14, 2020, XP051849404, 5 Pages, Sections 1, 2, tables 1(a), 1(b).
(Continued)

*Primary Examiner* — Kenneth T Lam
(74) *Attorney, Agent, or Firm* — Thien T. Nguyen

(57) ABSTRACT

In an aspect, a UE determines a mapping a mapping between (i) one or more measurements of one or more reference signals based on one or more transmit codebooks and (ii) one or more angles of departure (AoDs) associated with transmission of the one or more reference signals. The UE transmits an indication of the mapping to a position estima-
(Continued)

tion entity. The position estimation entity determines a positioning estimate of the UE based at least in part upon the one or more AoDs.

38 Claims, 15 Drawing Sheets

(51) Int. Cl.
    *H04B 7/06*           (2006.01)
    *H04B 17/20*        (2015.01)

(58) Field of Classification Search
    CPC .............. H04W 24/08; H04W 64/006; H04W 64/00; H04L 5/0048
    See application file for complete search history.

(56) References Cited

U.S. PATENT DOCUMENTS

| | | | | |
|---|---|---|---|---|
| 2020/0145977 | A1* | 5/2020 | Kumar | G01S 5/0063 |
| 2020/0212978 | A1* | 7/2020 | Zhao | H04B 7/0696 |
| 2021/0364593 | A1* | 11/2021 | Fellhauer | G01S 5/0273 |
| 2023/0305099 | A1* | 9/2023 | Thomas | G01S 5/0072 |
| 2024/0061065 | A1* | 2/2024 | Priyanto | G01S 5/04 |
| 2024/0064694 | A1* | 2/2024 | Priyanto | G01S 5/0244 |
| 2024/0295625 | A1* | 9/2024 | Hasegawa | G01S 5/0263 |

OTHER PUBLICATIONS

International Search Report and Written Opinion—PCT/US2021/072672—ISA/EPO—Mar. 17, 2022.

Nokia, et al., "Angle of Departure UE Positioning Technique", 3GPP TSG-RAN WG2 Meeting #108, 3GPP Draft, R2-1916105, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817654, 6 Pages.

Qualcomm Incorporated: "Potential Enhancements on DL-AoD Positioning", 3GPP TSG RAN WG1 #104-e, 3GPP Draft, R1-2101470, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971635, 8 Pages.

* cited by examiner

250

270

LMF

272

SLP

260

5GC

266

264

AMF

SMF

UPF

262

265

265

263

263

220

NEW RAN

224 ng-eNB gNB

222

223

204

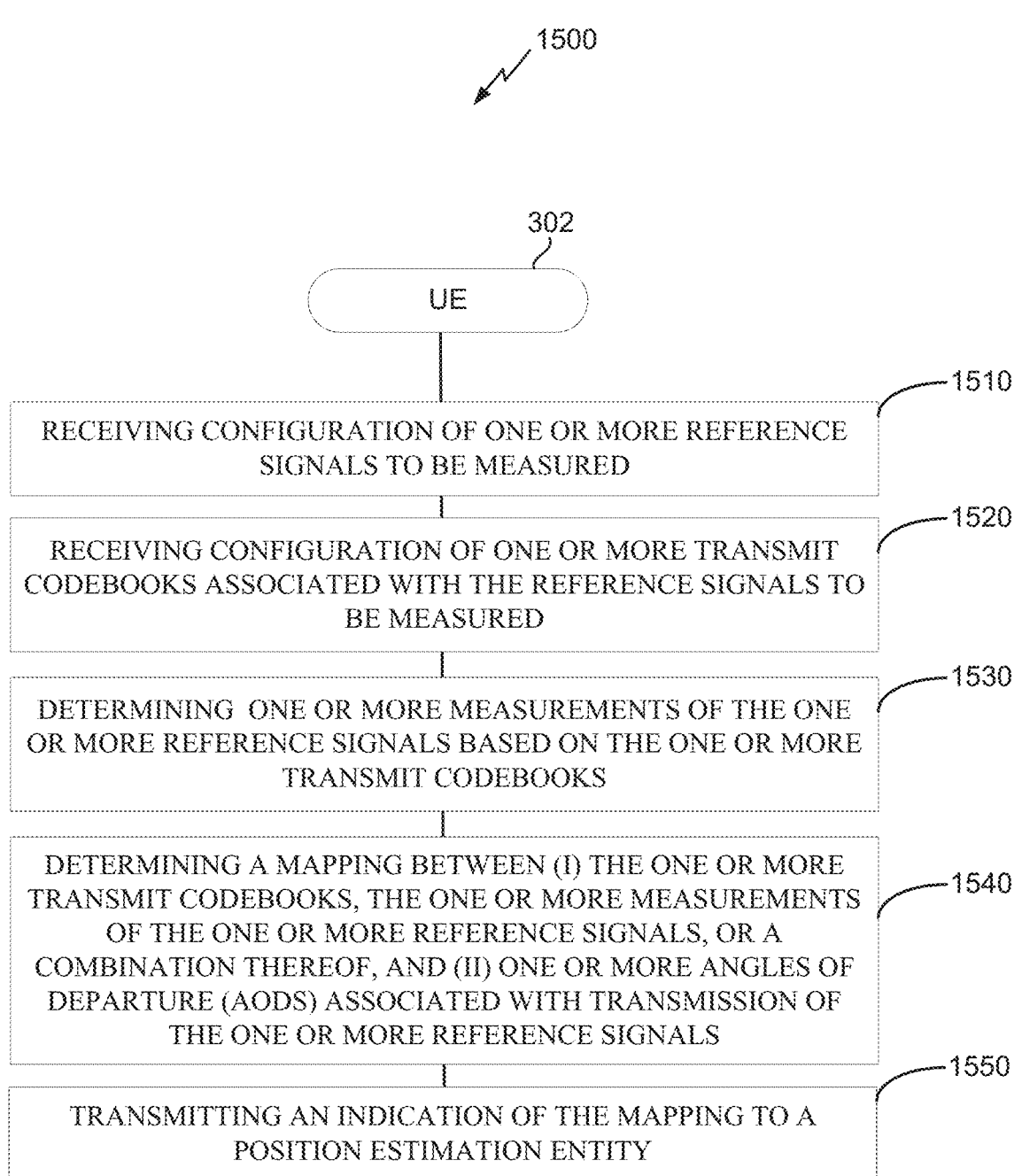

1500

302

UE

1510

RECEIVING CONFIGURATION OF ONE OR MORE REFERENCE SIGNALS TO BE MEASURED

1520

RECEIVING CONFIGURATION OF ONE OR MORE TRANSMIT CODEBOOKS ASSOCIATED WITH THE REFERENCE SIGNALS TO BE MEASURED

1530

DETERMINING ONE OR MORE MEASUREMENTS OF THE ONE OR MORE REFERENCE SIGNALS BASED ON THE ONE OR MORE TRANSMIT CODEBOOKS

1540

DETERMINING A MAPPING BETWEEN (I) THE ONE OR MORE TRANSMIT CODEBOOKS, THE ONE OR MORE MEASUREMENTS OF THE ONE OR MORE REFERENCE SIGNALS, OR A COMBINATION THEREOF, AND (II) ONE OR MORE ANGLES OF DEPARTURE (AODS) ASSOCIATED WITH TRANSMISSION OF THE ONE OR MORE REFERENCE SIGNALS

1550

TRANSMITTING AN INDICATION OF THE MAPPING TO A POSITION ESTIMATION ENTITY

MAPPING OF REFERENCE SIGNAL MEASUREMENTS TO ANGLES OF DEPARTURE

CROSS-REFERENCE TO RELATED APPLICATIONS

The present application for patent claims priority to Greek Patent Application No. 20210100083, entitled "MAPPING OF REFERENCE SIGNAL MEASUREMENTS TO ANGLES OF DEPARTURE," filed Feb. 8, 2021, and is a national stage application, filed under 35 U.S.C. § 371, of International Patent Application No. PCT/US2021/072672, entitled, "MAPPING OF REFERENCE SIGNAL MEASUREMENTS TO ANGLES OF DEPARTURE", filed Dec. 1, 2021, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes: receiving configuration of one or more reference signals to be measured; receiving configuration of one or more transmit codebooks associated with the reference signals to be measured; determining one or more measurements of the one or more reference signals based on the one or more transmit codebooks; determining a mapping between (i) the one or more measurements of the one or more reference signals and (ii) one or more angles of departure (AoDs) associated with transmission of the one or more reference signals; and transmitting an indication of the mapping to a position estimation entity.

In some aspects, the mapping is based upon field testing performed in association with one or more test user equipments (UEs), or the mapping is based upon crowd-sourcing in association with one or more UEs, or a combination thereof.

In some aspects, the position estimation entity corresponds to the UE, another UE, a base station, a location management function (LMF), or a combination thereof.

In some aspects, the one or more reference signals comprise one or more sidelink (SL) reference signals, or the one or more reference signals comprise one or more downlink (DL) signals.

In some aspects, the mapping is one of a plurality of mappings between different measurements associated with reception of the one or more reference signals and different respective one or more AoDs associated with transmission of the one or more reference signals.

In some aspects, each measurement is derived using at least one or more Pre-coding Matrix Indicators (PMIs) associated with the one or more transmit codebooks and the one or more reference signals.

In some aspects, the one or more measurements include: one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

In some aspects, the one or more AoDs comprise: a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

In some aspects, the multiple Azimuth AoDs, the multiple Zenith AoDs, the multiple Zenith and Azimuth AoDs, the multiple ranges of Azimuth AoDs, the multiple ranges of Zenith AoDs, and/or the multiple ranges Zenith and Azimuth AoDs are associated with different multipaths of the one or more reference signals.

In some aspects, the mapping is configured at the UE via unicast or broadcast location assistance data.

In some aspects, the mapping is transmitted to a location management function (LMF) via New Radio Positioning Protocol A (NRPPa) signaling.

In some aspects, the method includes performing, for one or more other reference signal measurements, formula-based AoD computation in lieu of mapping-based AoD lookup.

In some aspects, the one or more reference signals comprise a reference signal for positioning (RS-P), a channel state indication (CSI)-RS, a synchronization signal block (SSB), a tracking RS (TRS), or a demodulation RS (DMRS).

In some aspects, the one or more reference signals comprise a downlink positioning reference signal (DL-PRS), or the one or more reference signals comprise a sidelink positioning reference signal (SL-PRS).

In some aspects, the mapping is determined so as to weight a first performance characteristic over a second performance characteristic.

In some aspects, the first performance characteristic is associated with spectral efficiency of transmission and the second performance characteristic is associated with a reference signal received power (RSRP) of an earliest path of signal transmission, and the one or more reference signals are associated with communication of data, or the second performance characteristic is associated with spectral efficiency of transmission and the first performance characteristic is associated with a reference signal received power (RSRP) of an earliest path of signal transmission, and the one or more reference signals are associated with positioning of the UE.

In some aspects, the receiving of the configuration of the one or more transmit codebooks comprises receiving a transmit antenna configuration, and deriving the one or more transmit codebooks based on the transmit antenna configuration.

In an aspect, a method of operating a position estimation entity includes: receiving, from a user equipment (UE), an indication of a mapping between (i) one or more measurements of one or more reference signals based on one or more transmit codebooks, and (ii) one or more angles of departure (AoDs) associated with transmission of the one or more reference signals; and determining a positioning estimate of the UE based at least in part upon the one or more AoDs.

In some aspects, the mapping is based upon field testing performed in association with one or more test user equipments (UEs), or the mapping is based upon crowd-sourcing in association with one or more UEs, or a combination thereof.

In some aspects, the position estimation entity corresponds to the UE, another UE, a base station, a location management function (LMF), or a combination thereof.

In some aspects, the one or more reference signals comprise one or more sidelink (SL) reference signals, or the one or more reference signals comprise one or more downlink (DL) signals.

In some aspects, the mapping is one of a plurality of mappings between different measurements associated with reception of the one or more reference signals and different respective one or more AoDs associated with transmission of the one or more reference signals.

In some aspects, each measurement is derived using at least one or more Pre-coding Matrix Indicators (PMIs) associated with the one or more transmit codebooks and the one or more reference signals.

In some aspects, the one or more measurements include: one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

In some aspects, the one or more AoDs comprise: a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

In some aspects, the mapping is configured at the UE via unicast or broadcast location assistance data.

In some aspects, the one or more signals comprise a reference signal for positioning (RS-P), a channel state indication (CSI)-RS, a synchronization signal block (SSB), a tracking RS (TRS), or a demodulation RS (DMRS).

In some aspects, the one or more reference signals comprise a downlink positioning reference signal (DL-PRS), or the one or more reference signals comprise a sidelink positioning reference signal (SL-PRS).

In an aspect, a user equipment (UE) includes: a memory; at least one transceiver; and at least one processor communicatively coupled to the memory and the at least one transceiver, the at least one processor configured to: receive configuration of one or more reference signals to be measured; receive configuration of one or more transmit codebooks associated with the reference signals to be measured; determine one or more measurements of the one or more reference signals based on the one or more transmit codebooks; determine a mapping between (i) the one or more measurements of the one or more reference signals and (ii) one or more angles of departure (AoDs) associated with transmission of the one or more reference signals; and transmit an indication of the mapping to a position estimation entity.

In some aspects, the one or more reference signals comprise one or more sidelink (SL) reference signals, or the one or more reference signals comprise one or more downlink (DL) signals.

In some aspects, the one or more measurements include: one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

In some aspects, the one or more AoDs comprise: a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

In some aspects, the one or more reference signals comprise a reference signal for positioning (RS-P), a channel state indication (CSI)-RS, a synchronization signal block (SSB), a tracking RS (TRS), or a demodulation RS (DMRS).

In an aspect, a position estimation entity includes: a memory; at least one transceiver; and at least one processor communicatively coupled to the memory and the at least one transceiver, the at least one processor configured to: receive, from a user equipment (UE), an indication of a mapping between (i) one or more measurements of one or more reference signals based on one or more transmit codebooks, and (ii) one or more angles of departure (AoDs) associated with transmission of the one or more reference signals; and determine a positioning estimate of the UE based at least in part upon the one or more AoDs.

In some aspects, the one or more reference signals comprise one or more sidelink (SL) reference signals, or the one or more reference signals comprise one or more downlink (DL) signals.

In some aspects, the one or more measurements include: one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

In some aspects, the one or more AoDs comprise: a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

In some aspects, the one or more reference signals comprise a reference signal for positioning (RS-P), a channel state indication (CSI)-RS, a synchronization signal block (SSB), a tracking RS (TRS), or a demodulation RS (DMRS).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 15 and 16 illustrate example methods of wireless communication, according to aspects of the disclosure.

DETAILED DESCRIPTION

Figure 1:
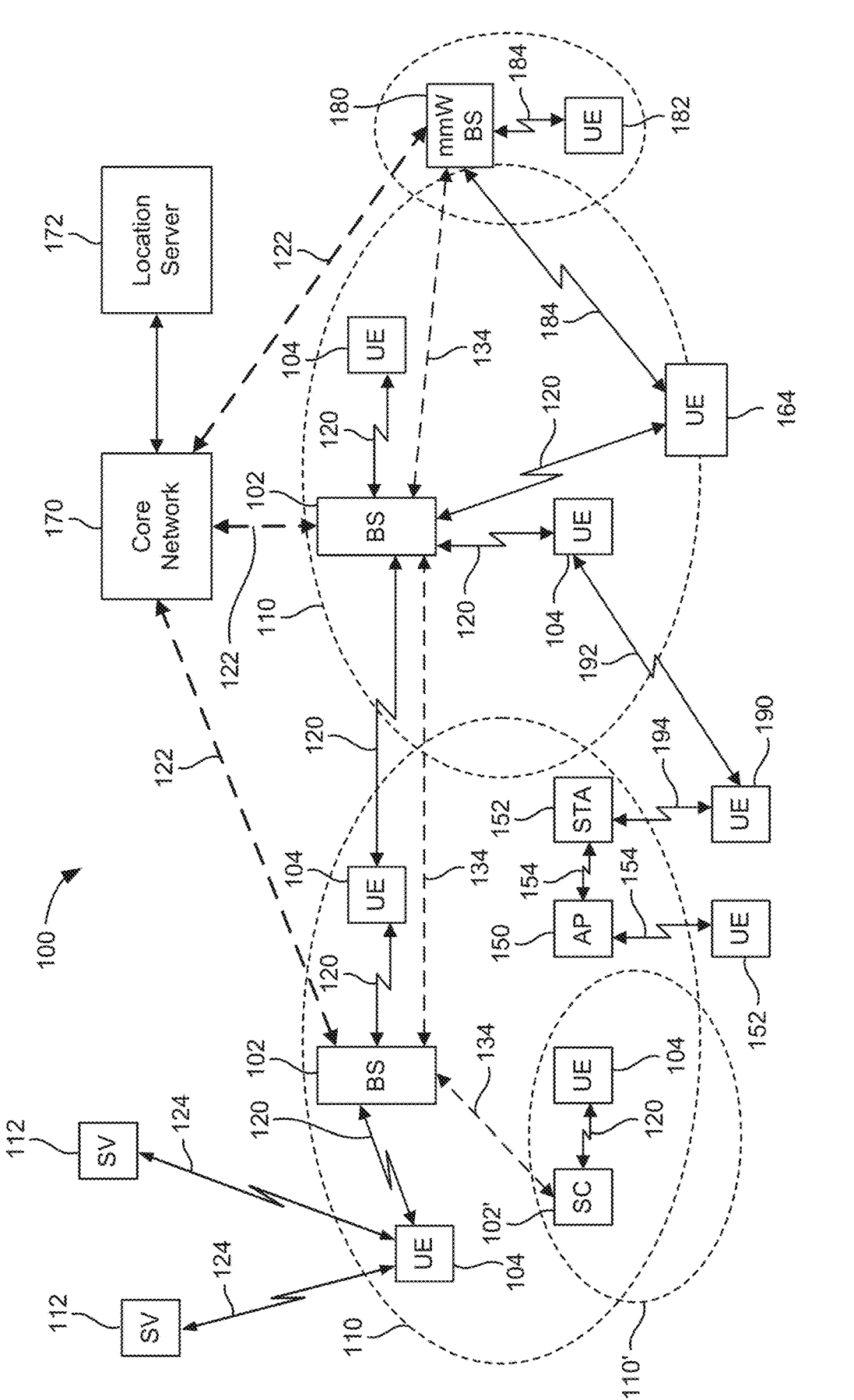
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam. In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Figure 2A:
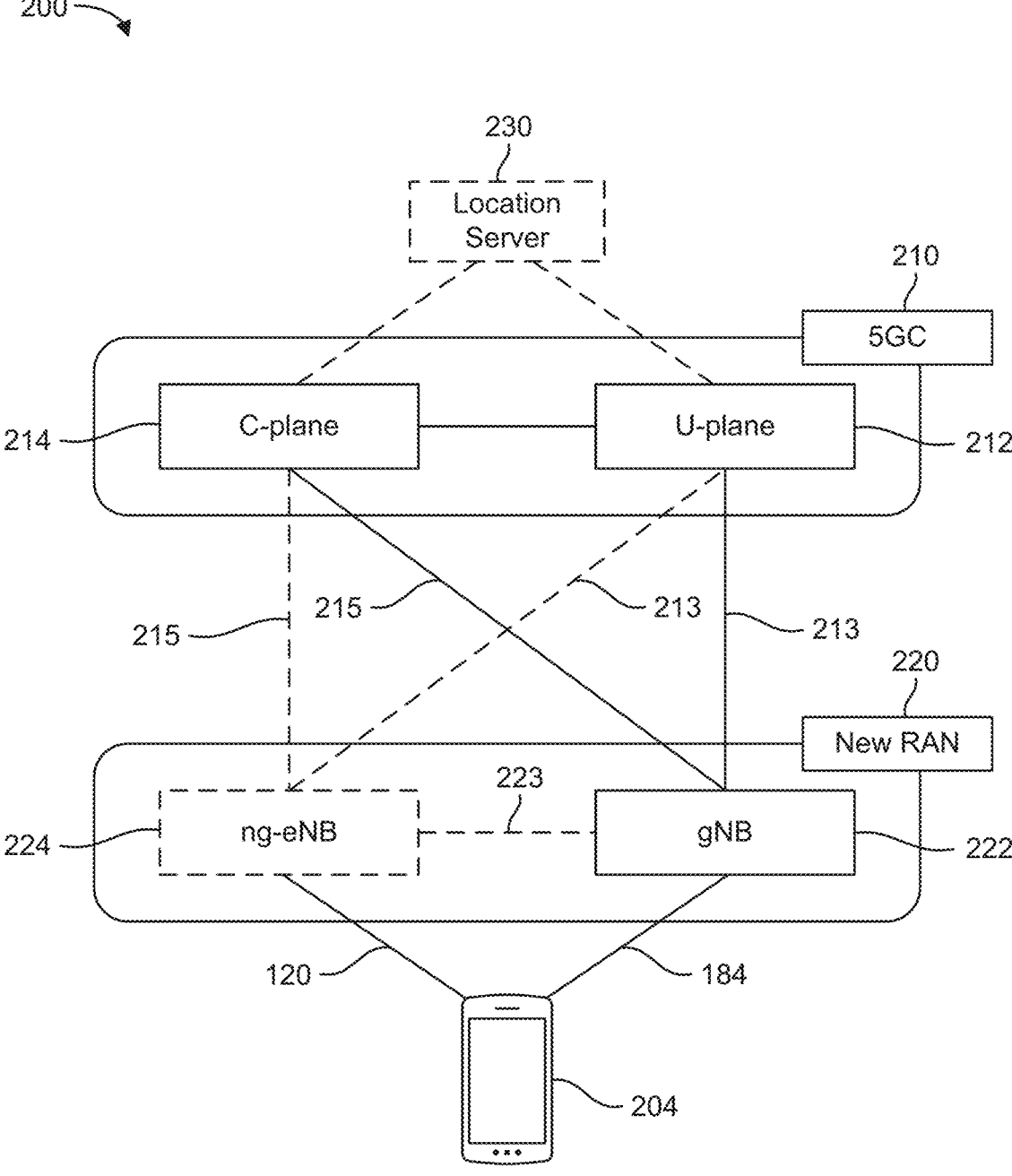
FIGS. 2A and 2B illustrate example wireless network structures, according to aspects of the disclosure.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. FIG. 2A illustrates an example wireless network structure 200.

For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNB s 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNB s 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
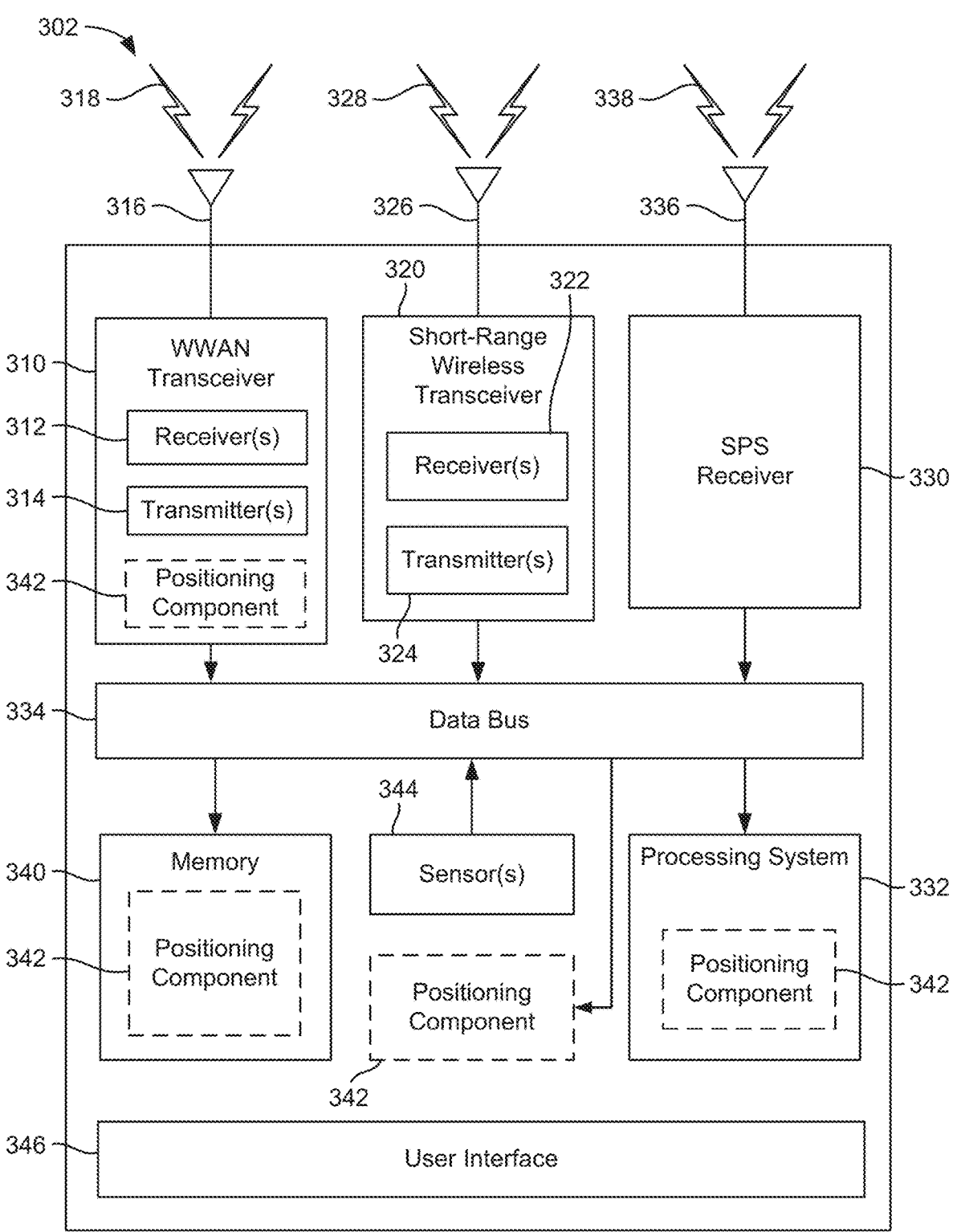
FIGS. 3A to 3C are simplified block diagrams of several sample aspects of components that may be employed in a user equipment (UE), a base station, and a network entity, respectively, and configured to support communications as taught herein.
Figure 3B:
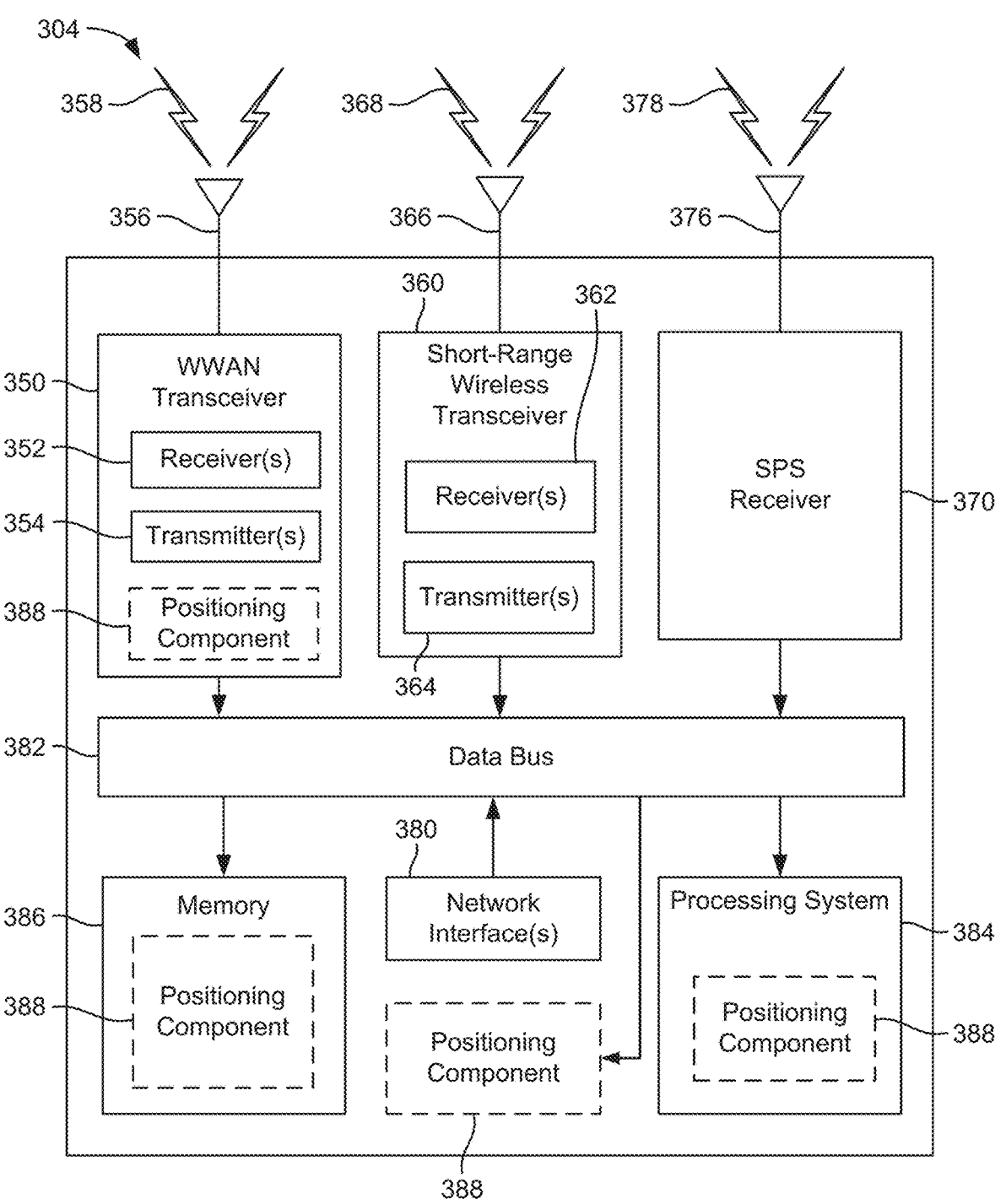
Figure 3C:
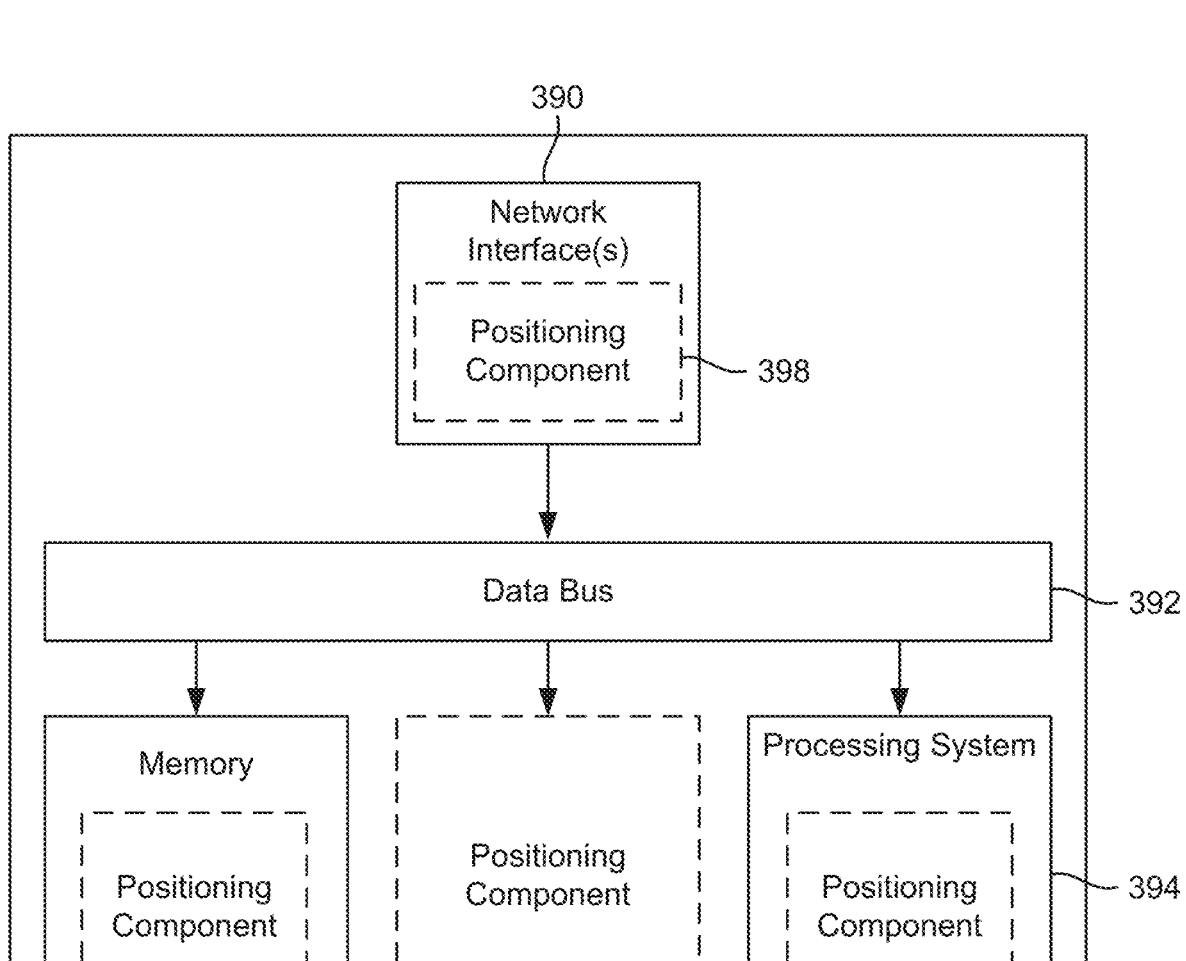

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity.

More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
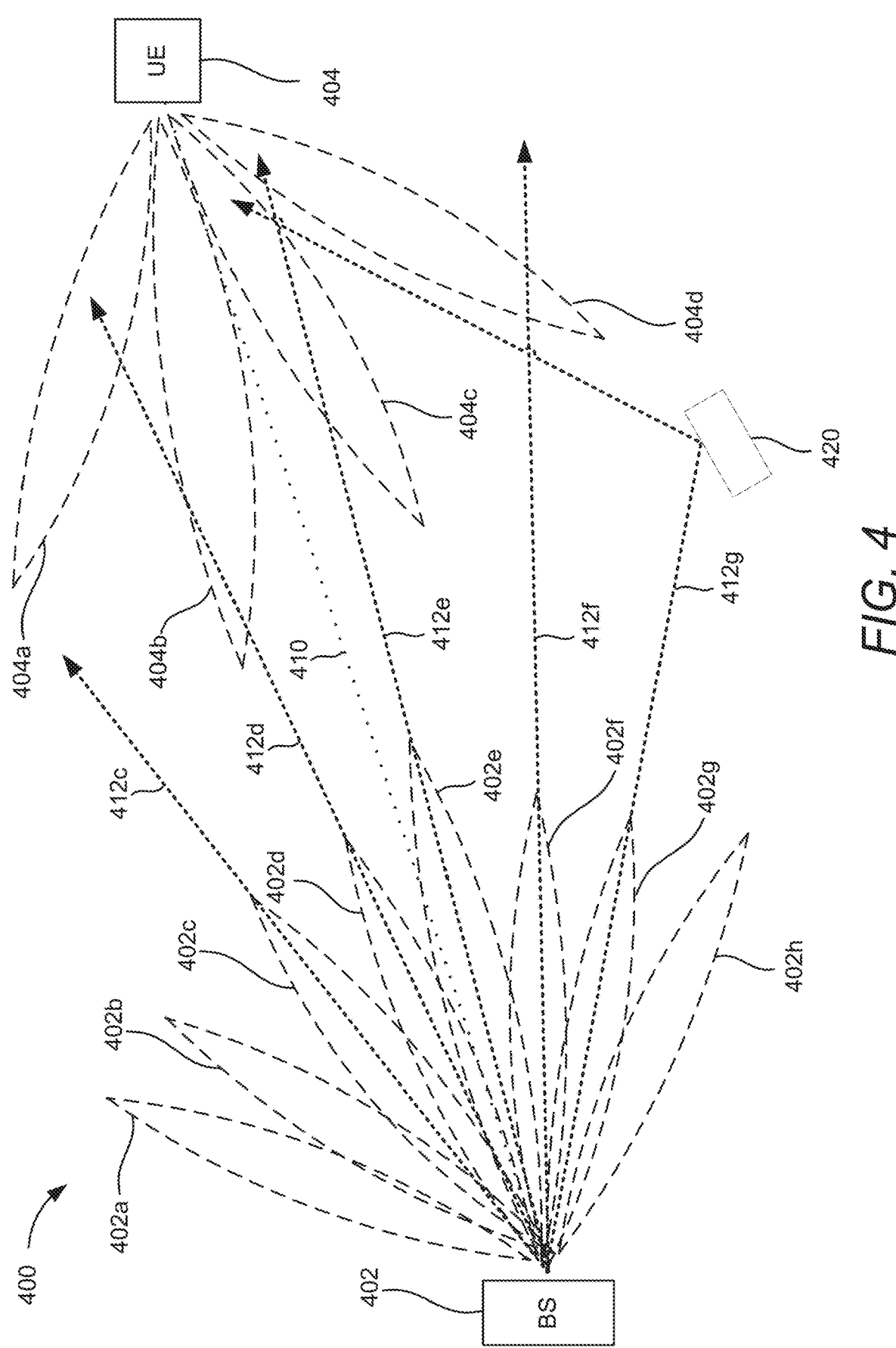
FIG. 4 is a diagram illustrating an example base station in communication with an example UE, according to aspects of the disclosure.

FIG. 4 is a diagram 400 illustrating a base station (BS) 402 (which may correspond to any of the base stations described herein) in communication with a UE 404 (which may correspond to any of the UEs described herein). Referring to FIG. 4, the base station 402 may transmit a beamformed signal to the UE 404 on one or more transmit beams 402a, 402b, 402c, 402d, 402e, 402f, 402g, 402h, each having a beam identifier that can be used by the UE 404 to identify the respective beam. Where the base station 402 is beamforming towards the UE 404 with a single array of antennas (e.g., a single TRP/cell), the base station 402 may perform a "beam sweep" by transmitting first beam 402a, then beam 402b, and so on until lastly transmitting beam 402h. Alternatively, the base station 402 may transmit beams 402a-402h in some pattern, such as beam 402a, then beam 402h, then beam 402b, then beam 402g, and so on. Where the base station 402 is beamforming towards the UE 404 using multiple arrays of antennas (e.g., multiple TRPs/cells), each antenna array may perform a beam sweep of a subset of the beams 402a-402h. Alternatively, each of beams 402a-402h may correspond to a single antenna or antenna array.

FIG. 4 further illustrates the paths 412c, 412d, 412e, 412f, and 412g followed by the beamformed signal transmitted on beams 402c, 402d, 402e, 402f, and 402g, respectively. Each path 412c, 412d, 412e, 412f, 412g may correspond to a single "multipath" or, due to the propagation characteristics of radio frequency (RF) signals through the environment, may be comprised of a plurality (a cluster) of "multipaths." Note that although only the paths for beams 402c-402g are shown, this is for simplicity, and the signal transmitted on each of beams 402a-402h will follow some path. In the example shown, the paths 412c, 412d, 412e, and 412f are straight lines, while path 412g reflects off an obstacle 420 (e.g., a building, vehicle, terrain feature, etc.).

The UE 404 may receive the beamformed signal from the base station 402 on one or more receive beams 404a, 404b, 404c, 404d. Note that for simplicity, the beams illustrated in FIG. 4 represent either transmit beams or receive beams, depending on which of the base station 402 and the UE 404 is transmitting and which is receiving. Thus, the UE 404 may also transmit a beamformed signal to the base station 402 on one or more of the beams 404a-404d, and the base station 402 may receive the beamformed signal from the UE 404 on one or more of the beams 402a-402h.

In an aspect, the base station 402 and the UE 404 may perform beam training to align the transmit and receive beams of the base station 402 and the UE 404. For example, depending on environmental conditions and other factors, the base station 402 and the UE 404 may determine that the best transmit and receive beams are 402d and 404b, respectively, or beams 402e and 404c, respectively. The direction of the best transmit beam for the base station 402 may or may not be the same as the direction of the best receive beam, and likewise, the direction of the best receive beam for the UE 404 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 402 may transmit reference signals (e.g., PRS, CRS, TRS, CSI-RS, PSS, SSS, etc.) to the UE 404 on one or more of beams 402a-402h, with each beam having a different transmit angle. The different transmit angles of the beams will result in different received signal strengths (e.g., RSRP, RSRQ, SINR, etc.) at the UE 404. Specifically, the received signal strength will be lower for transmit beams 402a-402h that are further from the line of sight (LOS) path 410 between the base station 402 and the UE 404 than for transmit beams 402a-402h that are closer to the LOS path 410.

In the example of FIG. 4, if the base station 402 transmits reference signals to the UE 404 on beams 402c, 402d, 402e, 402f, and 402g, then transmit beam 402e is best aligned with the LOS path 410, while transmit beams 402c, 402d, 402f, and 402g are not. As such, beam 402e is likely to have a higher received signal strength at the UE 404 than beams 402c, 402d, 402f, and 402g. Note that the reference signals transmitted on some beams (e.g., beams 402c and/or 4020 may not reach the UE 404, or energy reaching the UE 404 from these beams may be so low that the energy may not be detectable or at least can be ignored.

The UE 404 can report the received signal strength, and optionally, the associated measurement quality, of each measured transmit beam 402c-402g to the base station 402, or alternatively, the identity of the transmit beam having the highest received signal strength (beam 402e in the example of FIG. 4). Alternatively or additionally, if the UE 404 is also engaged in a round-trip-time (RTT) or time-difference of arrival (TDOA) positioning session with at least one base station 402 or a plurality of base stations 402, respectively, the UE 404 can report reception-to-transmission (Rx-Tx) or reference signal time difference (RSTD) measurements (and optionally the associated measurement qualities), respectively, to the serving base station 402 or other positioning entity. In any case, the positioning entity (e.g., the base station 402, a location server, a third-party client, UE 404, etc.) can estimate the angle from the base station 402 to the UE 404 as the AoD of the transmit beam having the highest received signal strength at the UE 404, here, transmit beam 402e.

In one aspect of DL-AoD-based positioning, where there is only one involved base station 402, the base station 402 and the UE 404 can perform a round-trip-time (RTT) procedure to determine the distance between the base station 402 and the UE 404. Thus, the positioning entity can determine both the direction to the UE 404 (using DL-AoD positioning) and the distance to the UE 404 (using RTT positioning) to estimate the location of the UE 404. Note that the AoD of the transmit beam having the highest received signal strength does not necessarily lie along the LOS path 410, as shown in FIG. 4. However, for DL-AoD-based positioning purposes, it is assumed to do so.

In another aspect of DL-AoD-based positioning, where there are multiple involved base stations 402, each base station 402 can report the determined AoD to the UE 404 to the positioning entity. The positioning entity receives multiple such AoDs from a plurality of involved base stations 402 (or other geographically separated transmission points) for the UE 404. With this information, and knowledge of the base stations' 402 geographic locations, the positioning entity can estimate a location of the UE 404 as the intersection of the received AoDs. There should be at least two involved base stations 402 for a two-dimensional (2D) location solution, but as will be appreciated, the more base stations 402 that are involved in the positioning procedure, the more accurate the estimated location of the UE 404 will be.

To perform an UL-AoA positioning procedure, the UE 404 transmits uplink reference signals (e.g., UL-PRS, SRS, DMRS, etc.) to the base station 402 on one or more of uplink transmit beams 404a-404d. The base station 402 receives the uplink reference signals on one or more of uplink receive beams 402a-402h. The base station 402 determines the angle of the best receive beams 402a-402h used to receive the one or more reference signals from the UE 404 as the AoA from itself to the UE 404. Specifically, each of the receive beams 402a-402h will result in a different received signal strength (e.g., RSRP, RSRQ, SINR, etc.) of the one or more reference signals at the base station 402. Further, the channel impulse response of the one or more reference signals will be smaller for receive beams 402a-402h that are further from the actual LOS path between the base station 402 and the UE 404 than for receive beams 402a-402h that are closer to the LOS path. Likewise, the received signal strength will be lower for receive beams 402a-402h that are further from the LOS path than for receive beams 402a-402h that are closer to the LOS path. As such, the base station 402 identifies the receive beam 402a-402h that results in the highest received signal strength and, optionally, the strongest channel impulse response, and estimates the angle from itself to the UE 404 as the AoA of that receive beam 402a-402h. Note that as with DL-AoD-based positioning, the AoA of the receive beam 402a-402h resulting in the highest received signal strength (and strongest channel impulse response if measured) does not necessarily lie along the LOS path 410. However, for UL-AoA-based positioning purposes, it is assumed to do so.

Note that while the UE 404 is illustrated as being capable of beamforming, this is not necessary for DL-AoD and UL-AoA positioning procedures. Rather, the UE 404 may receive and transmit on an omni-directional antenna.

Where the UE 404 is estimating its location (i.e., the UE is the positioning entity), it needs to obtain the geographic location of the base station 402. The UE 404 may obtain the location from, for example, the base station 402 itself or a location server (e.g., location server 230, LMF 270, SLP 272). With the knowledge of the distance to the base station 402 (based on the RTT or timing advance), the angle between the base station 402 and the UE 404 (based on the UL-AoA of the best receive beam 402a-402h), and the known geographic location of the base station 402, the UE 404 can estimate its location.

Alternatively, where a positioning entity, such as the base station 402 or a location server, is estimating the location of the UE 404, the base station 402 reports the AoA of the receive beam 402a-402h resulting in the highest received signal strength (and optionally strongest channel impulse response) of the reference signals received from the UE 404, or all received signal strengths and channel impulse responses for all receive beams 402 (which allows the positioning entity to determine the best receive beam 402a-402h). The base station 402 may additionally report the distance to the UE 404. The positioning entity can then estimate the location of the UE 404 based on the UE's 404 distance to the base station 402, the AoA of the identified receive beam 402a-402h, and the known geographic location of the base station 402.

There are various motivations for enhancing angle-based positioning methods (e.g., DL-AoD, UL-AoA). For example, the bandwidth of the measured signals does not significantly affect the precision of angle-based methods. As another example, angle-based methods are not sensitive to network synchronization errors. As yet another example, massive MIMO is available in both FR1 and FR2, thereby enabling angle measurement. As another example, DL-AoD is supported for UE-based positioning, and UL-AoA can supplement RTT or uplink-based positioning methods naturally without additional overhead.

Figure 5:
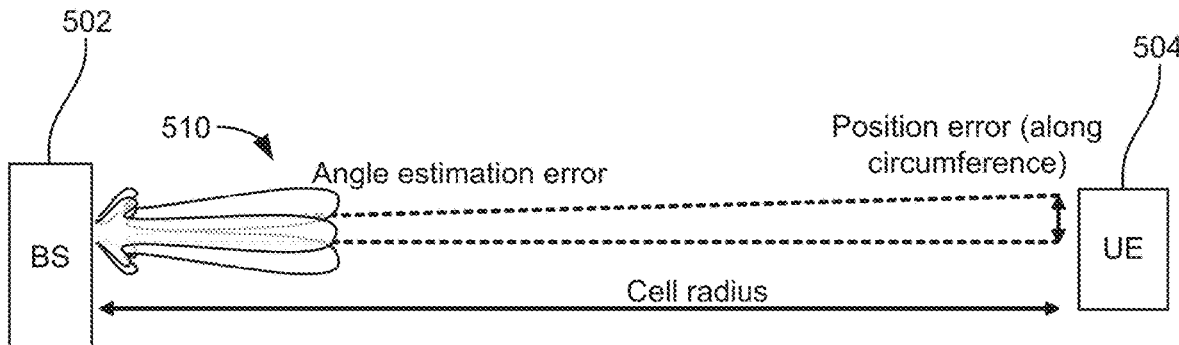
FIG. 5 is a diagram illustrating the types of positioning error associated with a downlink or uplink angle-based positioning method, according to aspects of the disclosure.

FIG. 5 is a diagram illustrating the types of positioning errors associated with a downlink or uplink angle-based positioning method (e.g., DL-AoD, UL-AoA), according to aspects of the disclosure. In the example of FIG. 5, a base station 502 (e.g., any of the base stations described herein) is beamforming towards a UE 504 (e.g., any of the UEs described herein). The base station 502 may transmit downlink reference signals (e.g., PRS) to the UE 504 and/or receive uplink reference signals (e.g., SRS) from the UE 504 on multiple beams 510. In the former case, the beams 510 may be downlink transmit beams, and in the latter case, the beams 510 may be uplink receive beams.

As shown in FIG. 5, the location of the UE 504 is on a circumference defined by the radius of the cell (i.e., the distance between base station 502 and the UE 504) and the angle and width of the best beam 510 used to communicate with the UE 504. The UE's 504 location can therefore be estimated based on the location of the base station 502, the cell radius, and the angle and width of the best beam 510. The UE's 504 estimated location is subject to different types of errors, however. Specifically, there is an angle estimation error (i.e., an error in the estimated angle of the best beam 510) and a position error along the circumference (i.e., an error in the UE's 504 location on the circumference defined by the angle and width of the best beam 510).

The following table illustrates example position errors (along the circumference) based on different angle estimation errors. Specifically, the rows show the position error given a specific angle error (leftmost column) and cell radius. The last row shows the implied standard deviation (ISD) for each example cell radius.

TABLE 1

| Angle Error | Cell radius (meters) | | | | | | |
|---|---|---|---|---|---|---|---|
| (degrees) | 10 | 50 | 100 | 116 | 200 | 289 | 500 |
| 1 | 0.2 | 0.9 | 1.7 | 2.0 | 3.5 | 5.0 | 8.7 |
| 2 | 0.3 | 1.7 | 3.5 | 4.0 | 7.0 | 10.1 | 17.5 |
| 5 | 0.9 | 4.4 | 8.7 | 10.1 | 17.5 | 25.2 | 43.7 |
| 10 | 1.7 | 8.7 | 17.5 | 20.2 | 35.0 | 50.5 | 87.5 |
| ISD (meters) | 17 | 87 | 173 | 200 | 346 | 500 | 866 |

As shown in Table 1 above, the angle accuracy (or angle error) should be within a few degrees to provide a noticeable impact to the positioning accuracy. For example, as shown in Table 1, at 200 meters ISD, the angle error should be within one to two degrees to keep the position error lower than three meters.

Figure 6:
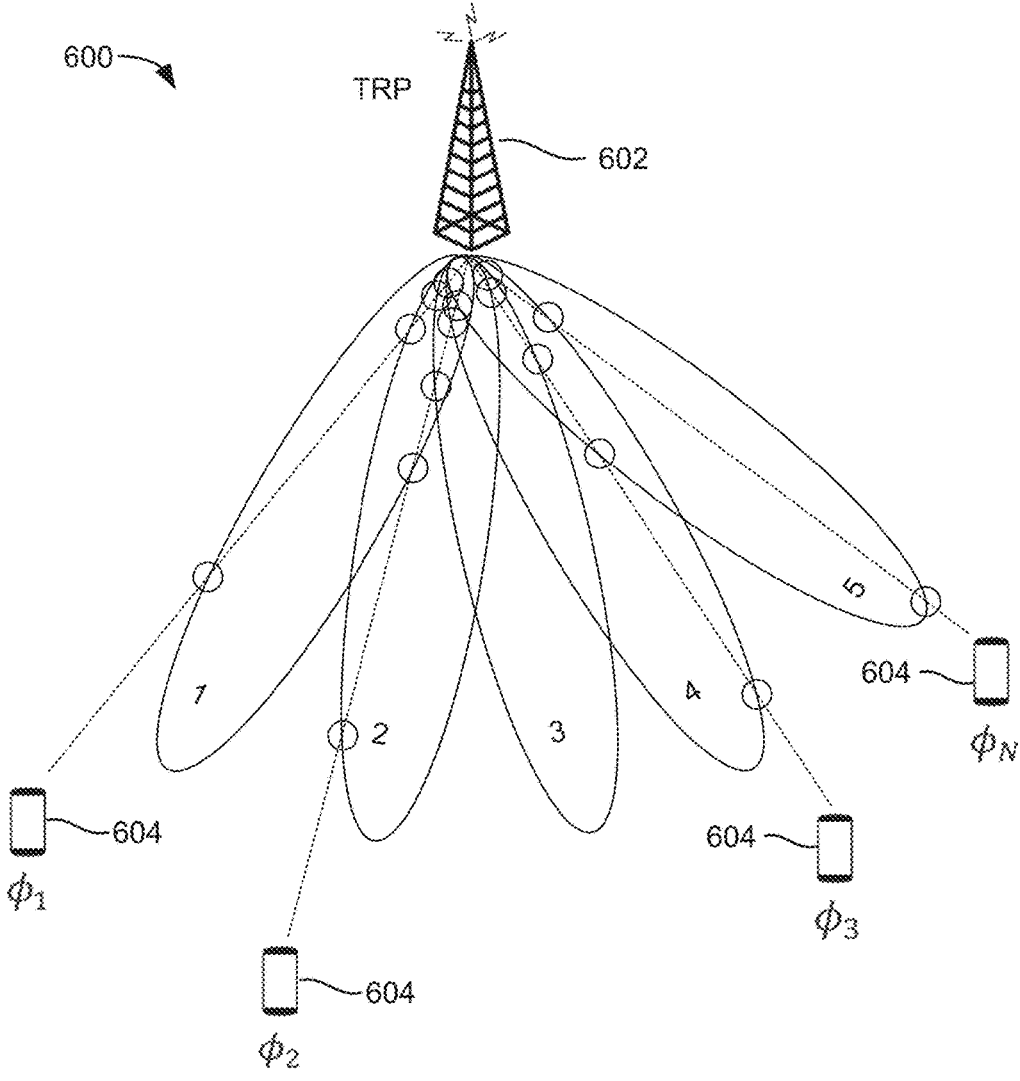
FIG. 6 is a diagram illustrating aspects of downlink angle-of-departure (AoD) positioning, according to aspects of the disclosure.

FIG. 6 is a diagram 600 illustrating further aspects of DL-AoD positioning, according to aspects of the disclosure. In the example of FIG. 6, a TRP 602 (e.g., a TRP of any of the base stations described herein) is beamforming towards a UE 604 (e.g., any of the UEs described herein). The TRP 602 may transmit downlink reference signals (e.g., PRS) to the UE 604 on multiple downlink transmit beams, labeled "1," "2," "3," "4," and "5."

Each potential location of the UE 604 around the TRP 602 in the azimuth domain may be represented as $\phi_k$. For simplicity, FIG. 6 illustrates only four possible locations of the UE 604 around the TRP 602, denoted $\phi_1$, $\phi_2$, $\phi_3$, and $\phi_N$. For a DL-AoD positioning session, the UE 604 measures the signal strength (e.g., RSRP) of each detectable downlink transmit beam from the TRP 602. The circled points on each line between the TRP 602 and an illustrated location of the UE 604 indicate where on the measurable beams the signal strength measurements will be taken. That is, the circles represent the relative signal strength that the UE 604 will measure for each beam intersecting the line, with circles closer to the UE 604 indicating a higher signal strength.

For each potential $\phi_k \in [\phi_1, \ldots, \phi_N]$ at which the UE 604 may be located, and for each beam $l \in [1, \ldots, N_{beams}]$ that is being transmitted, the TRP 602 calculates the expected signal strength/receive power $P_{i,k}$ at the UE 604. The TRP 602 derives the normalized vector $P_k$, for each $k \in [1, \ldots N]$, as:

$$P_k = \begin{bmatrix} \dfrac{P_{i,1}}{\max\limits_{l}(P_{i,l})} \\ \vdots \\ \dfrac{P_{i,N_{beams}}}{\max\limits_{l}(P_{i,l})} \end{bmatrix}$$

The TRP 602 then transmits the PRS resources to the UE 604 on the downlink transmit beams. Each beam may correspond to a different PRS resource, or the same PRS resource may be transmitted on each beam, or some combination thereof. The UE 604 can report up to eight RSRPs, with one for each PRS resource. The TRP 602 (or other positioning entity) denotes as $\hat{P}$ the received vector of normalized RSRP, and finds the $\hat{k}$ that results in a $P_{\hat{k}}$ close to $\hat{P}$.

Figure 7:
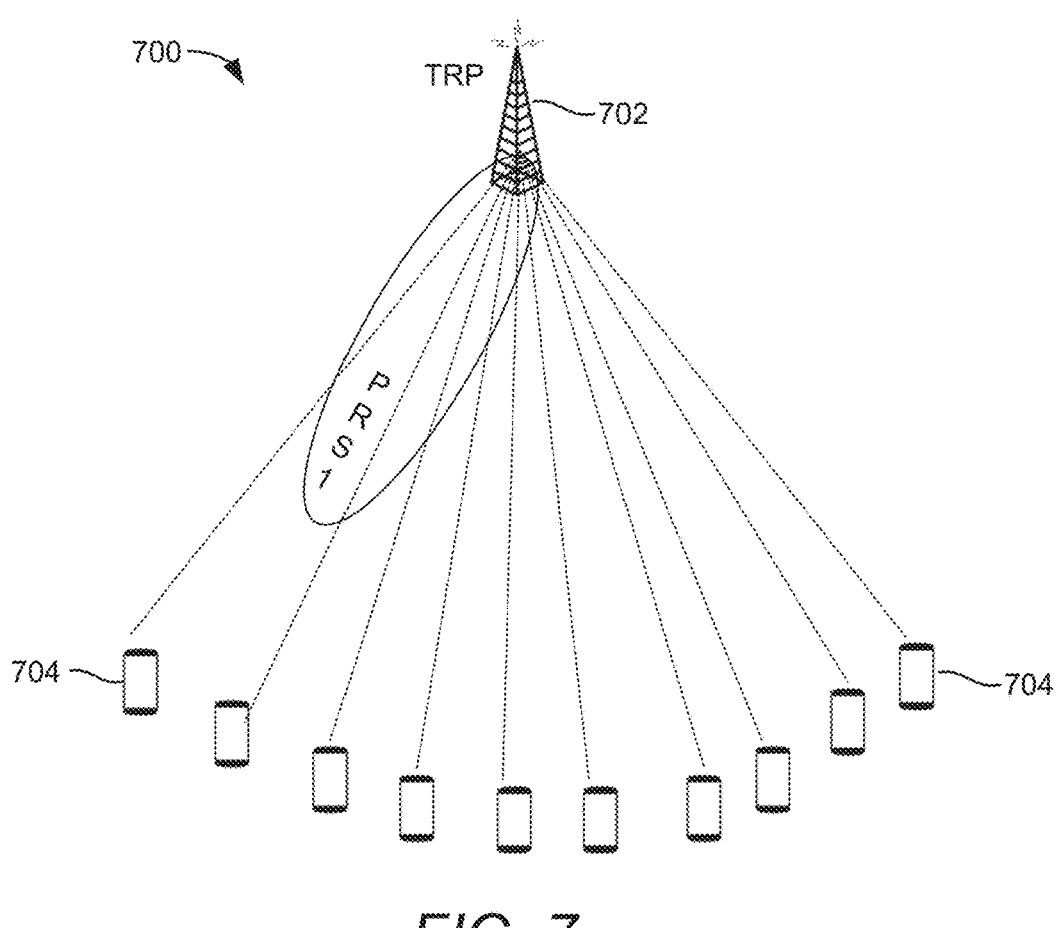
FIG. 7 is a diagram illustrating a base station transmitting a first positioning reference signal (PRS) resource towards possible locations of a UE in the azimuth domain, according to aspects of the disclosure.
Figure 8:
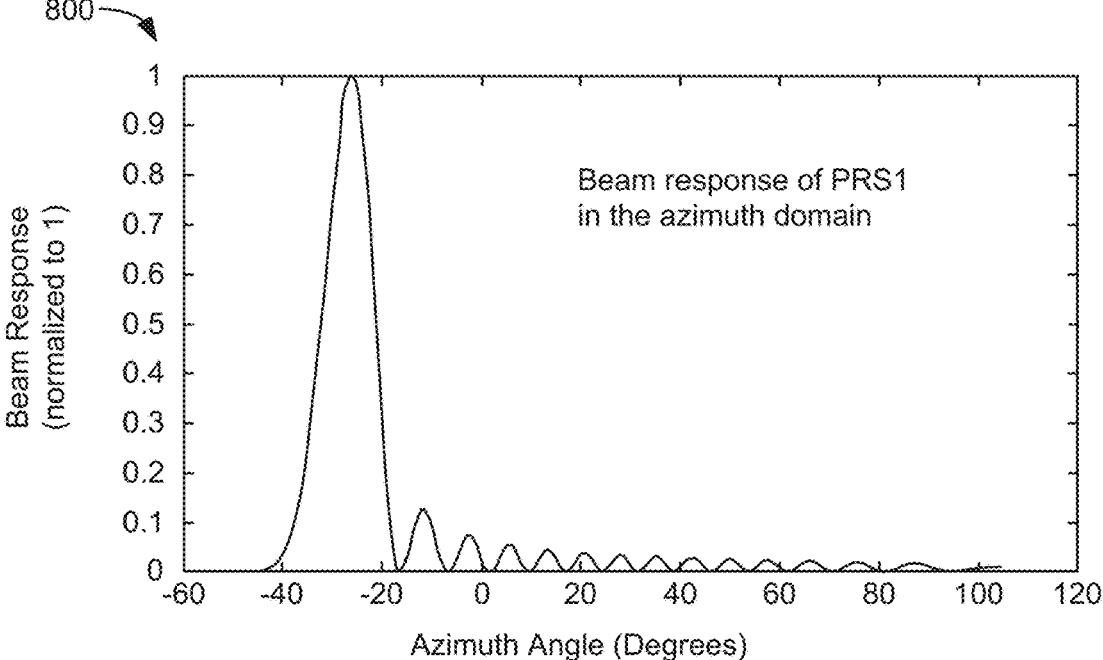
FIG. 8 is a graph illustrating an example beam response of the first PRS resource in FIG. 7 in the azimuth domain, according to aspects of the disclosure.

To derive the vectors $$\{P_k\}_{k=1}^{N},$$

the involved base stations need to report the vectors to the location server or the UE (i.e., the positioning entity), or report the beam response for each PRS resource. FIG. 7 is a diagram 700 illustrating a TRP 702 (e.g., a TRP of any of the base stations described herein) transmitting a first PRS resource (labeled "PRS1") towards possible locations of a UE 704 (e.g., any of the UEs described herein) in the azimuth domain. FIG. 8 is a graph 800 illustrating the beam response of PRS1 from FIG. 7 in the azimuth domain. The beam response is the shape of the beam as transmitted by the base station (here, TRP 702). The horizontal axis of graph 800 represents the azimuth angle (in degrees) and the vertical axis represents the beam response (normalized to '1').

Figure 9:
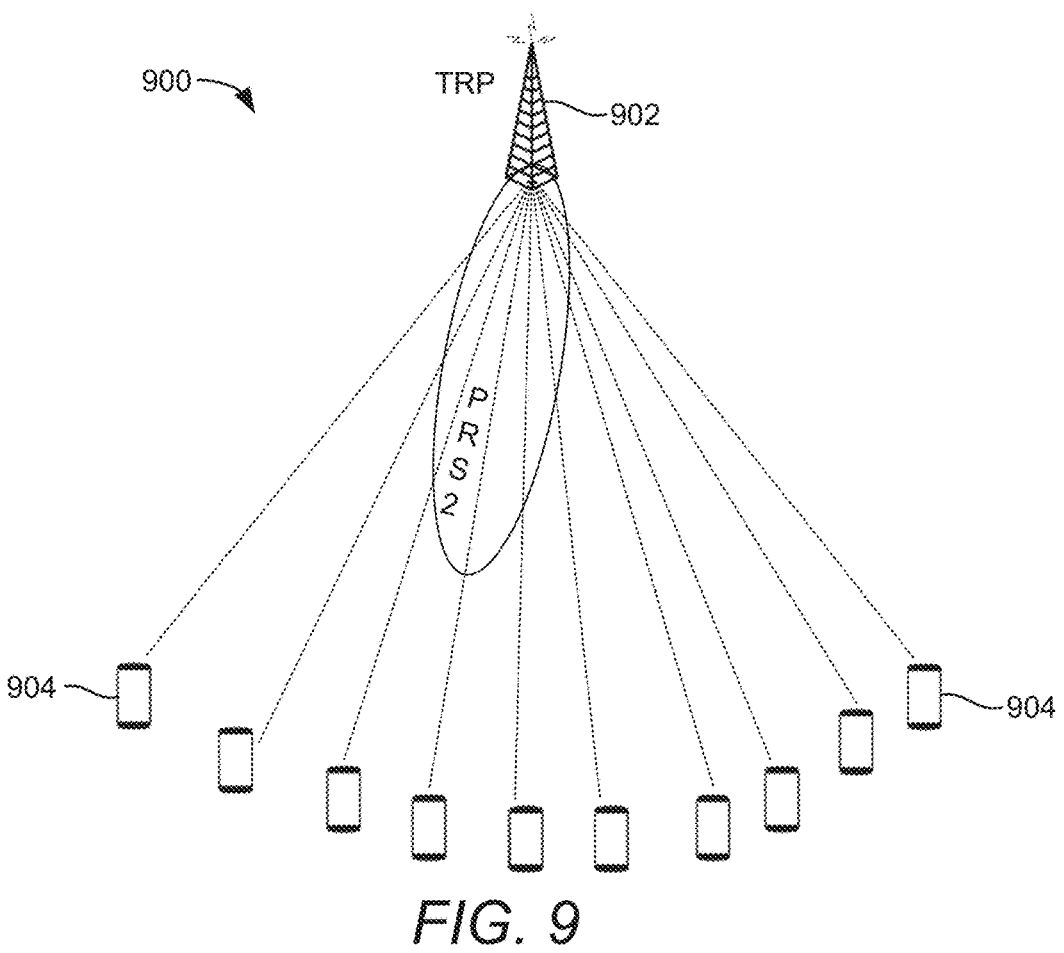
FIG. 9 is a diagram illustrating a base station transmitting a second PRS resource towards possible locations of a UE in the azimuth domain, according to aspects of the disclosure.
Figure 10:
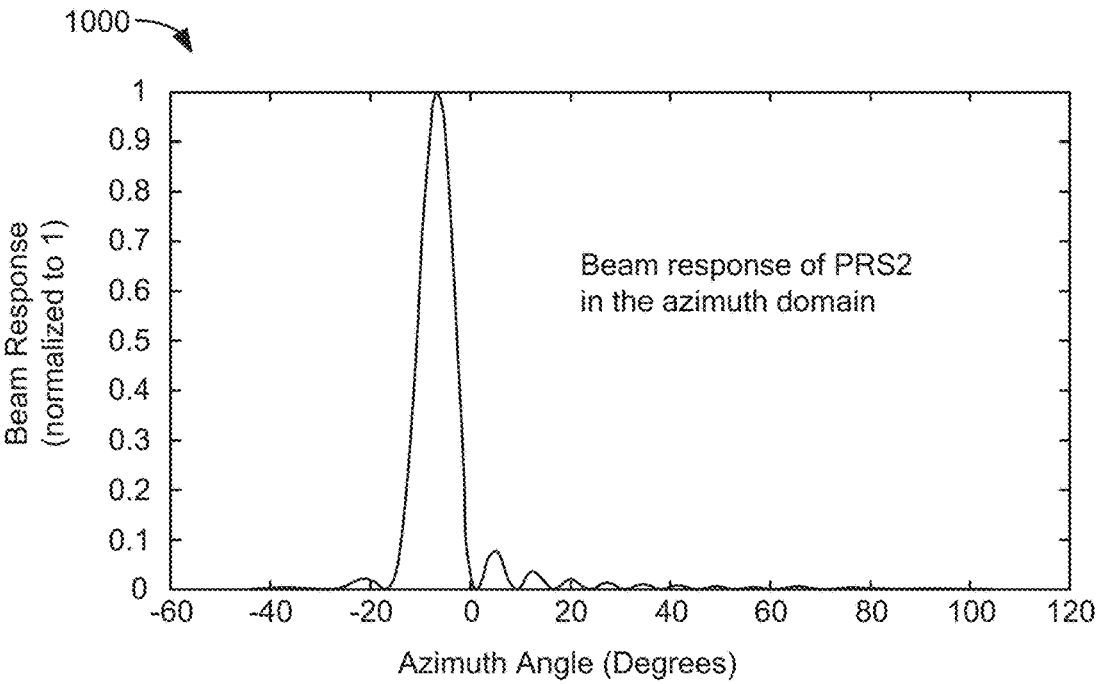
FIG. 10 is a graph illustrating an example beam response of the second PRS resource in FIG. 9 in the azimuth domain, according to aspects of the disclosure.

FIG. 9 is a diagram 900 illustrating a TRP 902 (e.g., a TRP of any of the base stations described herein) transmitting a second PRS resource (labeled "PRS2") towards possible locations of a UE 904 (e.g., any of the UEs described herein) in the azimuth domain. FIG. 10 is a graph 1000 illustrating the beam response of PRS2 from FIG. 9 in the azimuth domain. The horizontal axis of graph 1000 represents the azimuth angle (in degrees) and the vertical axis represents the beam response (normalized to '1').

Figure 11:
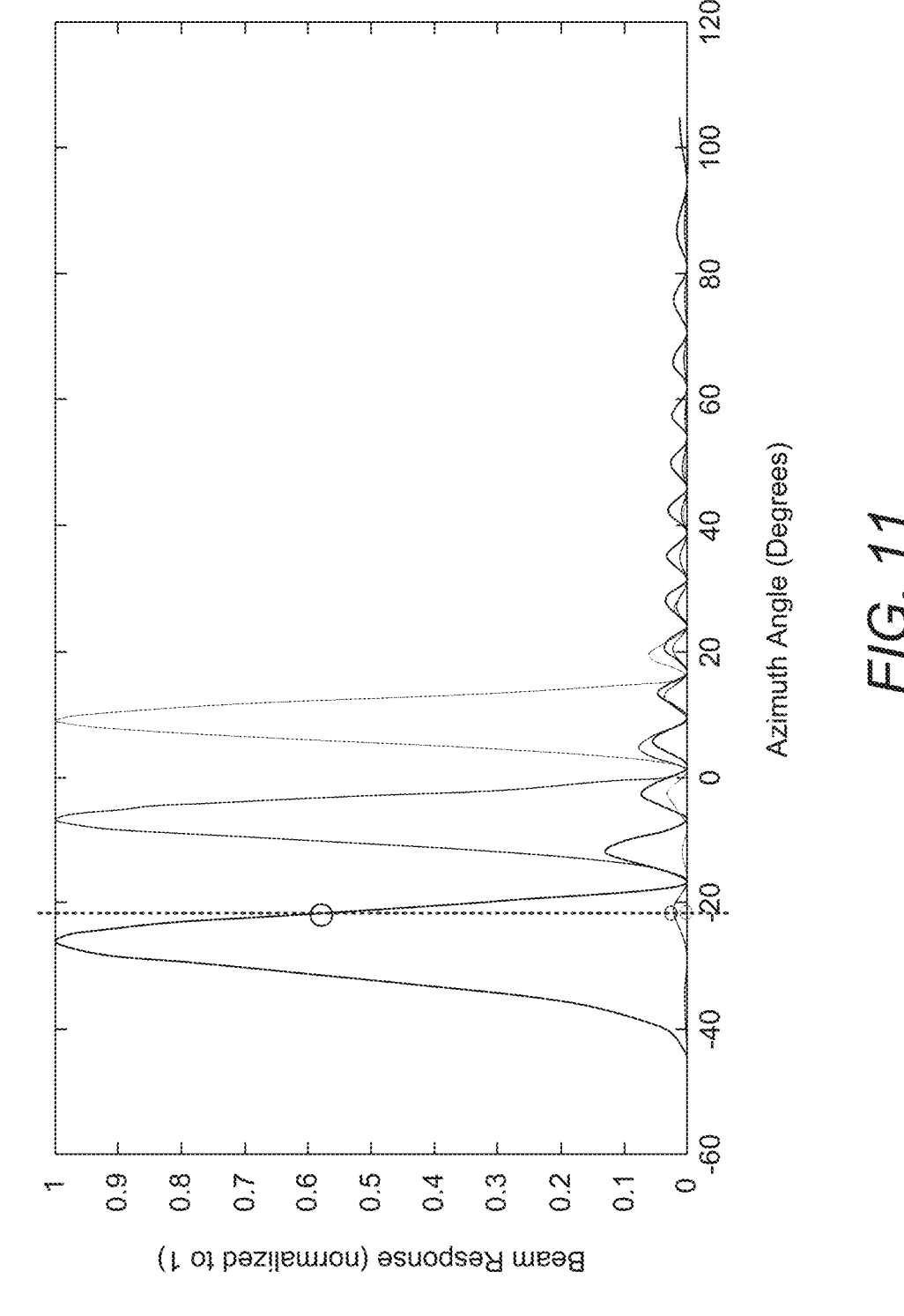
FIG. 11 is a graph illustrating an example beam response of three different PRS resources in the azimuth domain, according to aspects of the disclosure.

FIG. 11 is a graph 1100 illustrating the beam responses of three different PRS resources in the azimuth domain. That is, graph 1100 illustrates the beam shape for three downlink beams on which a base station transmits DL-PRS. The horizontal axis of graph 1100 represents the azimuth angle (in degrees) and the vertical axis represents the beam response (normalized to '1'). For each azimuth angle, the relative beam response is the information that is being used to compare against the reported relative RSRP. For example, a UE located at −20 degrees in the azimuth domain would be expected to report RSRP values for the three downlink transmit beams that correspond to the points on the illustrated beam responses that intersect the vertical line at −20 degrees. Note that the UE may not report the exact expected RSRP values, but the series of RSRP values that it does report should be able to be matched to a location in the azimuth domain based on the beam responses, here, −20 degrees. That is, a UE may report a series of RSRP values, and the positioning entity may determine the location of the UE in the azimuth domain based on where the reported RSRP measurements line up with the beam responses of the measured downlink transmit beams (e.g., −20 degrees in FIG. 11).

As such, the positioning entity needs to know the beam responses of the downlink transmit beams in order to determine the point on the beam responses that corresponds to the measured RSRPs. Different options have been proposed to report the beam responses of the downlink transmit beams (referred to as "beam shape assistance information") to the positioning entity. As a first option, the base station may report $$\{P_k\}_{k=1}^N$$

for each possible angle, where P is the expected receive power (e.g., RSRP), N is the number of angles, and k is an angle index. Specifically, the base station may report a list of angles (AoDs and/or AoAs, or zeniths of departure (ZoDs) and/or zeniths of arrival (ZoAs), or a combination of AoDs and/or AoAs and ZoDs and/or ZoAs). For each angle, the base station may report a list of PRS resource identifiers and a list of radiation powers (densities) at the angle, each of which is associated with a PRS resource identifier. As a second option, the base station may report the beam response of each PRS resource across AoD and/or ZoD. Specifically, the base station may report a list of PRS resource identifiers. For each PRS resource identifier, the base station may report a list of angles (AoDs and/or AoAs, or ZoDs and/or ZoAs, or a combination of AoDs and/or AoAs and ZoDs and/or ZoAs) and a list of radiation powers (densities) of the PRS resource, each of which is associated with the angle.

At least one aspect of the present disclosure is directed to techniques for reducing the amount of signaling needed for a beam response/shape report containing beam shape assistance information (also referred to as a "beam response report" or "beam shape report" or simply "beam report"). As an example, a base station may transmit eight PRS resources and need to report an angle granularity of every 0.5 degrees for a range of 120 degrees in the azimuth and zenith (elevation) domains. Five bits per value (providing 1 dB granularity) results in a conventional beam response/shape report size of 2.3 megabytes (MB) (i.e., 5*8*240*240=2.3 MB) per TRP. This beam response report size may be permissible for base station to location server reporting (as for UE-assisted positioning), but is too large for over-the-air (OTA) signaling to a UE (where the UE is the positioning entity, as in UE-based positioning).

Accordingly, at least one aspect of the present disclose is directed to including only the most significant part of the beam response/shape in the beam report. This can significantly reduce the signaling overhead with only a small performance impact. For example, a base station may report only angles of a beam response where the gain is within 'X' dB of the main peak of the beam response (e.g., anything above a normalized gain of 0.1 in the example of FIG. 10, or about −3 to −15 degrees). The value of 'X' may be configurable. For example, the value of 'X' can be decided by an operations, administration, and maintenance (OAM) configuration and can be signaled to all involved entities (e.g., the involved base stations/TRPs, the UE, and/or the location server).

The truncated (or reduced) beam response/shape may be signaled/reported in different ways. As a first signaling format, the beam report may represent the truncated beam response as a set (e.g., a table) of tuples representing the gain value at each azimuth angle and elevation angle having a gain value greater than or equal to 'X.' That is, for the portion of the beam response having a gain above 'X,' the beam report would include a set of {azimuth angle, elevation angle, gain} tuples, with each tuple indicating the gain of the beam response at a particular azimuth and elevation angle increment (e.g., 0.5 degree). Thus, for example, if five bits are needed to represent a gain value, there are eight PRS resources to report, the range of the azimuth and elevation angles is 10 degrees, and the angle reporting granularity (or quantization) is 0.5 degrees, then the report size would be 16 kilobytes (kB) (i.e., 5*8*20*20=16 kB) for the gain values, plus the number of bits needed to represent 80 angle values (i.e., 20 azimuth angles and 20 elevation angles at 0.5-degree increments). This first signaling format has an increased overhead of two additional fields (the azimuth and elevation fields), but is beneficial if the beam widths being reported are very small (e.g., a few degrees).

As a second signaling format, the beam report may include minimum and maximum azimuth angles, minimum and maximum elevation angles, and a matrix of beam gains for azimuth and elevation angles between those minimum and maximum angles. The minimum and maximum angles are the angles between which the gain values of the beam response are greater than or equal to 'X.' The matrix may be a two-dimensional (2D) matrix having one axis representing azimuth angles and the other axis representing elevation angles. Each axis would represent angle values from the minimum to the maximum angle. The axises may have some predefined granularity (or quantization), such as 0.5 degree.

Thus, for example, for a range of angle values from −30 degrees to −20 degrees (i.e., 10 degrees), the matrix would have 20 rows and 20 columns (to each represent 10 angles at 0.5-degree increments). This signaling format reduces overhead over the first signaling format insofar as only the minimum and maximum angle values for azimuth and elevation are reported, rather than an azimuth and elevation angle for each gain value. The UE, via some configuration (e.g., specified in the applicable standard, higher layer signaling, etc.), would know the angle granularity, and therefore, how to interpret the matrix of gain values. Thus, for example, if five bits are needed to represent a gain value, there are eight PRS resources to report, a difference of 20 degrees between the minimum and maximum angle values, and a granularity of 0.5 degrees, then the report size would be 64 kB (i.e., 5*8*40*40=64 kB) for the gain values, plus the number of bits needed to represent four angle values (i.e., two maximum and two minimum angle values).

As a third signaling format, the beam report may use the first or second signaling format for the significant portion of the beam response, then include a few other sparse {azimuth angle, elevation angle, gain} tuples to better capture features of the beam shape. For example, referring to FIG. 10, the beam report may use the first or second signaling format for angle values having a normalized gain above 0.1 (approximately −3 to −15 degrees). The beam report may then include a few other {azimuth angle, elevation angle, gain} tuples to capture the smaller peaks at approximately −22, 5, 12, and 20 degrees.

As an alternative technique to quantizing a beam response (or beam shape), as described above, a beam response may be reported using a basis function. A basis function is a function that can be used to approximate a beam response/shape given certain parameters. More specifically, a basis function would take certain parameters as input (e.g., beam peak, beam width, beam angle, number of antenna elements) and output an approximation of the beam response/shape for those parameters.

Figure 12:
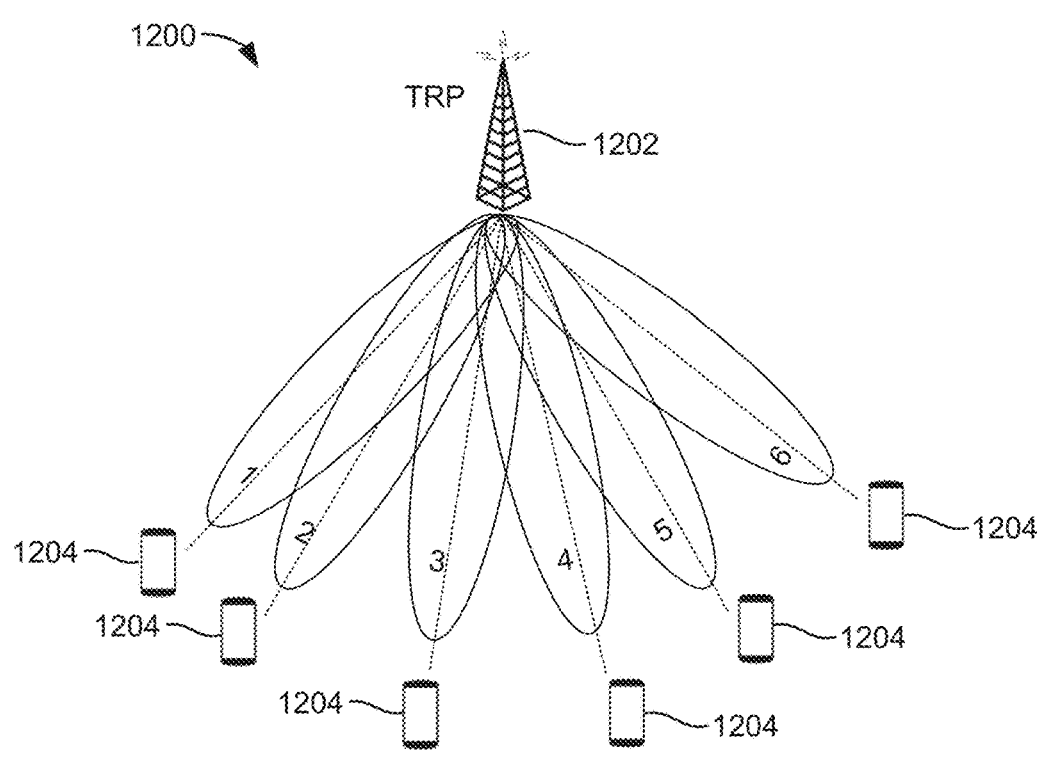
FIGS. 12 and 13 are diagrams of example scenarios in which a base station is transmitting reference signals on six downlink transmit beams, according to aspects of the disclosure.

FIG. 12 is a diagram 1200 of an example scenario in which a TRP 1202 (e.g., a TRP of any of the base stations described herein) is transmitting reference signals (e.g., PRS) on six downlink transmit beams, labeled "1" to "6." The TRP 1202 may be beamforming the reference signals towards one or more UEs 1204 (e.g., any of the UEs described herein). In the example of FIG. 12, the structure of each beam (e.g., the beam shape) is the same, only the beam direction is different. Note that applying the antenna element pattern on top of a beam will change the effective beam pattern. Also note that the further away from the bore sight of the antenna panel forming the beam, the larger the beam width compared to the boresight direction, as shown in FIG. 5. Thus, instead of ovals, the beam shapes would more accurately be represented by cones.

Figure 13:
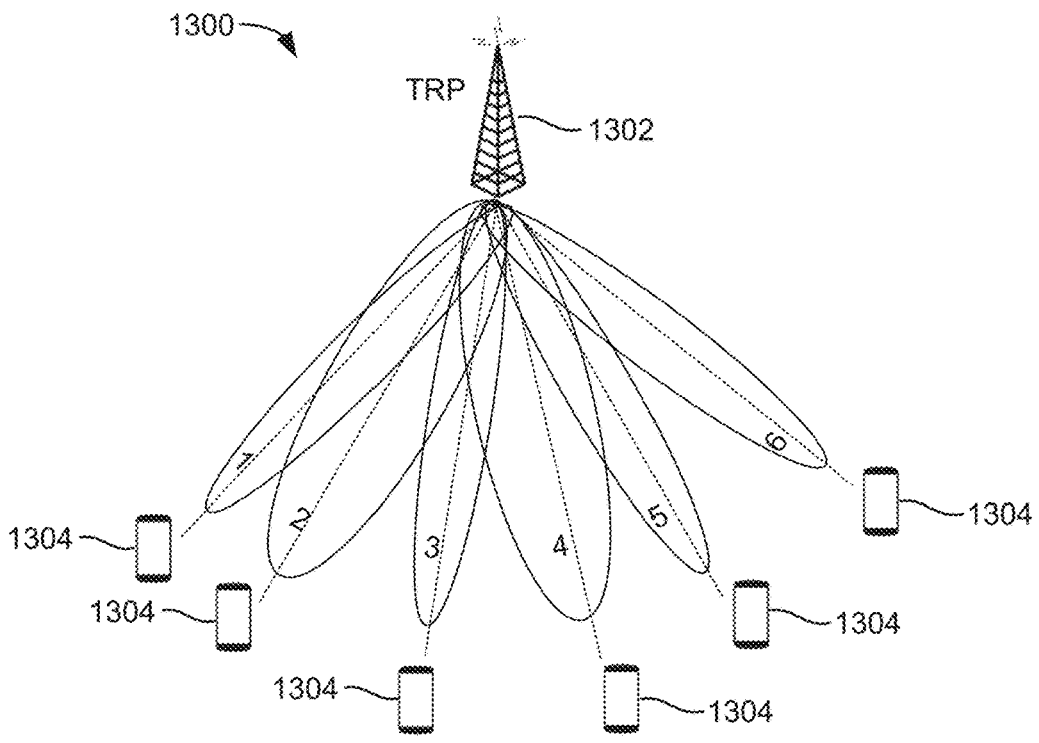

FIG. 13 is a diagram 1300 of an example scenario in which a TRP 1302 (e.g., a TRP of any of the base stations described herein) is transmitting reference signals (e.g., PRS) on six downlink transmit beams, labeled "1" to "6." The TRP 1302 may be beamforming the reference signals towards one or more UEs 1304 (e.g., any of the UEs described herein). In the example of FIG. 13, there are different sets of beam shapes. Specifically, in the example of FIG. 13, beams "1," "3," "5," and "6" have the same shape and beams "2" and "4" have the same shape.

The same basis function may be used for each beam having the same structure/shape. Thus, a single basis function may be used for all of the beams illustrated in FIG. 12, whereas two basis functions would be needed for the beams illustrated in FIG. 13 (i.e., one basis function for beams "1," "3," "5," and "6" and a different basis function for beams "2" and "4").

The beam response report provided to a UE (by the base station or location server) may include a beam basis function for each set of beams having the same shape, one or more parameters describing the beam shape (e.g., beam peak, beam width, beam angle, number of antenna elements) to be input into each basis function, the antenna element pattern for each beam, and a mapping from the beam index to the beam shape and its associated parameters.

A basis function may be a predefined function, such as a sinc function (for discrete Fourier transform (DFT) beams), a Gaussian function, a wavelet function, etc. A base station can send the different basis functions to the location server via NR positioning protocol type A (NRPPa) or LTE positioning protocol (LPP) type A (LPPa) signaling, to the UE through RRC or positioning SIB (pos-SIB) signaling, or both. Alternatively, the location server may relay the basis function to the UE via LPP signaling. The basis function(s) are expected to be static in nature and to not change over time (as the beam shape represented by that basis function should be the same given the same input parameters). As such, the UE and/or the location server only needs to receive the basis function(s) once during a positioning session.

If basis functions are used, all of a base station's downlink transmit beams can be represented as a linear combination of the basis functions. In an aspect, beam i can be represented as $$\sum_{k=1}^{N} F^k a^{ki}.$$

As such, a base station would simply need to send the basis function (F) and the set of parameters $\{a^{ki}\}$ for i=1 to N. If a base station is using predefined parameters, then only $\{a^{ki}\}$ for i=1 to N need to be sent, along with the basis function type (e.g., sinc, Gaussian, wavelet, etc.).

A beam codebook (or transmit codebook) includes a set of codewords, where a codeword is a set of analog phase shift values, or a set of magnitude plus phase shift values, applied to antenna elements, in order to form an analog beam. In phase-difference-based DL-AoD, a codebook is configured to the UE, and the UE measures X PRS resources and selects a single DFT beam (e.g., from a grid of oversampled DFT beams) for the precoding of each PRS resource which corresponds to the earliest TOA.

Figure 14:
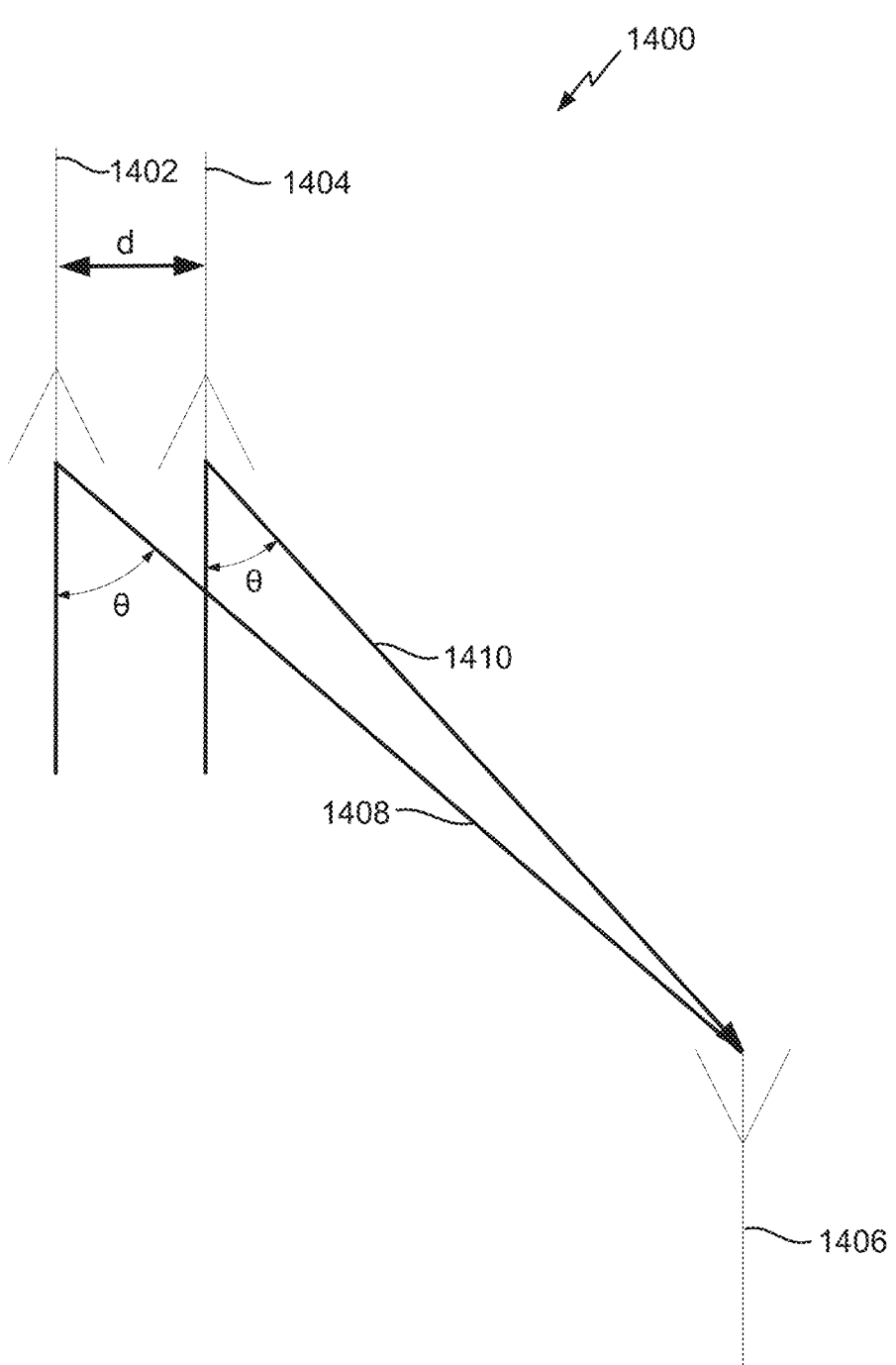
FIG. 14 depicts an antenna arrangement in accordance with an aspect of the disclosure.

In phase-difference-based DL-AoD, the transmitting device sends multiple PRS resources, each PRS resource via each of the physical antennas. As each PRS from the antennas in the array arrives at the receiver's single antenna, it is phase shifted from the previous PRS due to the different distance it has traveled from the transmitter as shown graphically in FIG. 14. FIG. 14 depicts an antenna arrangement 1400 in accordance with an aspect of the disclosure. The antenna arrangement 1400 includes transmit antennas (or transmitters) 1402 and 1404 and a receive antenna (or receiver) 1406. The transmit antennas 1404 and 1404 transmit reference signals 1408 and 1410, respectively, which are measured by the receiver 1406. In FIG. 14, the AoD of each reference signal is denoted as θ.

In the simple scenario shown in FIG. 14, one can estimate the angle of departure by measuring the phase difference between the PRS resources using a simple formula. In FIG. 14, there is no need to know the beam responses of the PRS resources. The receiver 1406 is only required to know the mapping of the PRS resources into the physical antennas, along with the uniform planar array (UPA) configuration of the TRP (P, N, M) (e.g., for CSI-RS, there are 13 configurations supported for a single panel in some systems), the relative distance, d, of the antennas 1402-1404 (the dH and dV parameters, e.g. to do the mapping of the DFT-index to an angle), and an oversampling factor (Q), e.g.:

TABLE 2

Supported Configurations of ($N_1$, $N_2$) and ($O_1$, $O_2$)

| Number if CSI-RS antenna ports, $P_{CSI-RS}$ | ($N_1$, $N_2$) | ($O_1$, $O_2$) |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

In terms of location assistance data overhead, 11 bits may be sufficient per TRP in some designs. For example, the UPA configuration may require 4 bits, dH and dV may require 4 bits (e.g., dH={0.5, 0.8}, dV={0.5, 0.8, 1, 2}), and Q may require 3 bits (e.g., Q={1, 2, 4, 8, 16, 32, 64, 128}). Such an approach has low overhead. However, PRS resources may be "unprecoded" so that each port maps to a physical antenna on the UPA. Such an approach may thereby be more applicable more in FR1 scenarios The NR Type I single-panel codebook uses a similar structure as the LTE codebooks for scenarios where there at least 4 antenna ports. That is, the NR Type I single-panel codebook is a constant modulus DFT codebook tailored for a dual-polarized 2D UPA. Intuitively, the construction of the codebook can be explained in the following manner.

A DFT precoder where the precoder vector used to precode a single-layer transmission using a single-polarized uniform linear array (ULA) with N antennas can be defined as $$ w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix}, $$

where k=0, 1, . . . QN−1 is the precoder index and Q is an integer oversampling factor.

If the UE is provided with such a codebook configuration (as already done for CSI feedback), and receives multiple single-port PRS resources (as already needed for the RSRP-based DL-AoD method), a UE, instead of just computing the RSRP vector, would be searching for the Pre-coding matrix indicator (PMI) of the codebook that maximizes the received power of the first path (i.e. use the N ports to derive a Delay-Angle Response, by computing the product of the received channels by each PMI in the configured codebook, and identify the earliest path together with the strongest peak for that earliest path).

This is similar to the CSI feedback procedure. For example, in 3GPP procedures on CSI feedback, a UE measures multiple ports of a single CSI-RS resource, and performs a PMI sweep to identify which PMI maximizes a spectral efficiency metric, whereas in this phase-difference DL-AoD method, the UE measures multiple ports (each one associated with a different PRS resource) for the purpose of sweeping the PMIs and identify the PMI index that corresponds to the maximum received power at an estimated TOA. Such a method would exploit additional measurements, and enable the UE to report the angle that is really associated with the earliest path, and not just an RSRP measurement which can be the result of multiple paths being summed at the receiver.

A corresponding precoder vector for a two-dimensional Uniform Planar Array (UPA) can be created by taking the Kronecker product of two precoder vectors as $w_{2D}(k, l) = w_{1D}(k) \otimes w_{1D}(l)$. Extending the precoder for the dual-polarized UPA is then done as $$ w_{2D,DP}(k, l, \phi) = $$
$$ \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix}, $$

where $e^{j\phi}$ is a co-phasing factor between the two orthogonal polarizations. The optimal co-phasing $e^{j\phi}$ between polarizations typically vary over frequency while the optimal beam direction $w_{2D}(k, l)$ typically is the same over the whole CSI reporting band.

Consider a codebook $w_l$ phase vector across Rx antennas of the $l^{th}$ codeword assuming $$ w_l(k) = \frac{1}{\sqrt{N_{hor}}} \cdot e^{\left(j2\pi \cdot \frac{k \cdot l}{Q \cdot N_{hor}}\right)}, \text{ with } k \in [0, 1, \dots, Q \cdot N_{hor} - 1], $$

where Q is the oversampling factor
Denote as $$ y_n^{(p)} $$

vector across Rx antennas of the $n^{th}$ time-domain tap of the estimated channel of the $p^{th}$ subarray. For the $n^{th}$ time-domain tap, calculate the received energy as follows $$ Q_{l,p} = |w_l^H y_n^{(p)}|^2 $$

for the $p^{th}$ subarray

In other words, for the $n^{th}$ received time-domain tap, a UE can calculate the received energy across all the configured PMIs of the codebook, and choose the PMI $\hat{l}$ that maximizes the received energy. In UE-assisted DL-AoD method, a UE would report the index $\hat{l}$ corresponding to the earliest tap, and for UE-based DL-AoD, a UE would map the index $\hat{l}$ back to an angle $\phi_{\hat{l}}$ using the knowledge of $d_H$ and the ULA config as follows:

$$ \frac{1}{\sqrt{N_{hor}}} \cdot e^{\left(j2\pi \cdot \frac{k \cdot \hat{l}}{Q \cdot N_{hor}}\right)} = \frac{1}{\sqrt{N_{hor}}} \cdot e^{(j2\pi \cdot k \cdot d_H \cdot \sin(\phi_{\hat{l}}))} \rightarrow \frac{\hat{l}}{N_{hor}} = d_H \cdot \sin(\phi_{\hat{l}}) \rightarrow $$

-continued $$\phi_{\hat{l}} = \arcsin\left(\frac{\hat{l}}{d_H \cdot Q \cdot N_{hor}}\right)$$

Such an approach for deriving AoD can be broadly characterized as a "formulaic" approach to AoD derivation (e.g., using the formulae noted above, the UE can derivate an estimate of the AoD). However, such derivations can be processing intensive and may increase positioning latency.

One or more aspects of the disclosure are thereby directed to a mapping between one or more reference signal measurements (e.g., one or more PMIs that maximum a received power of the reference signal on at least one path such as an earliest path for positioning or a path associated with a highest received power for communication, TOA measurement(s), RSRP measurement(s), etc.), or a combination thereof, and (ii) one or more AoD associated with transmission of the one or more reference signals. In some designs, such a mapping may be based on a table that is pre-configured based on field testing and/or dynamically configured (e.g., over time) based on crowd-sourcing, and may be specific to particular location region(s), particular TRP(s), etc. Such aspects may provide various technical advantages, such as improved AoD estimation accuracy and/or latency, which may in turn provide improved UE position estimation accuracy and/or latency.

FIG. 15 illustrates an exemplary process 1500 of wireless communication, according to aspects of the disclosure. In an aspect, the process 1500 may be performed by UE 302.

At 1510, UE 302 (e.g., receiver 312 or 322, etc.) receives (e.g., from a network component such as serving gNB, etc.) configuration (e.g., timing information, resources, periodicity, etc.) of one or more reference signals to be measured.

At 1520, UE 302 (e.g., receiver 312 or 322, etc.) receives (e.g., from a network component such as serving gNB, etc.) configuration of one or more transmit codebooks associated with the reference signals to be measured. In some designs, each transmit codebook may be associated with a plurality of PMIs. In some designs, the configuration of the one or more transmit codebooks may be received directly via OTA signaling. In other designs, information for deriving the one or more transmit codebooks may be received via OTA signaling, after which this information is used by UE 302 to derive the transmit codebook(s). For example, UE 302 may receive (e.g., via OTA signaling) a transmit antenna configuration, and may then derive the one or more transmit codebooks based on the transmit antenna configuration. Hence, the receipt of the configuration at 1520 can be either direct or indirect.

At 1530, UE 302 (e.g., receiver 312 or 322, processing system 332, etc.) determines one or more measurements of the one or more reference signals based on the one or more transmit codebooks. For example, the one or more measurements may include one or more PMIs that maximize a received power of the reference signal on at least one path (e.g., such as the earliest path(s), which is relevant for positioning), or one or more relative RSRP measurements, or one or more TOA measurements, or a combination thereof.

At 1540, UE 302 (e.g., receiver 312 or 322, processing system 332, positioning component 342, etc.) determines a mapping between (i) the one or more measurements of the one or more reference signals and (ii) one or more angles of departure (AoDs) associated with transmission of the one or more reference signals. In some designs, the mapping can be determined via lookup from an AoD table that is provisioned by the network with UE 302 in advance of the process 1500 of FIG. 15 (e.g., via unicast or broadcast location assistance data).

At 1550, UE 302 (e.g., transmitter 314 or 324, data bus 334, etc.) transmits an indication of the mapping to a position estimation entity. In some designs, the position estimation entity may correspond to the UE (e.g., in which case the transmission at 1550 is a logical transfer from one UE component to another over a data bus), another UE (e.g., via sidelink), a base station, a location management function (LMF), or a combination thereof. In some designs, the transmission at 1550 may include indication(s) of the AoD(s) to which the measurement(s) are mapped.

Figure 16:
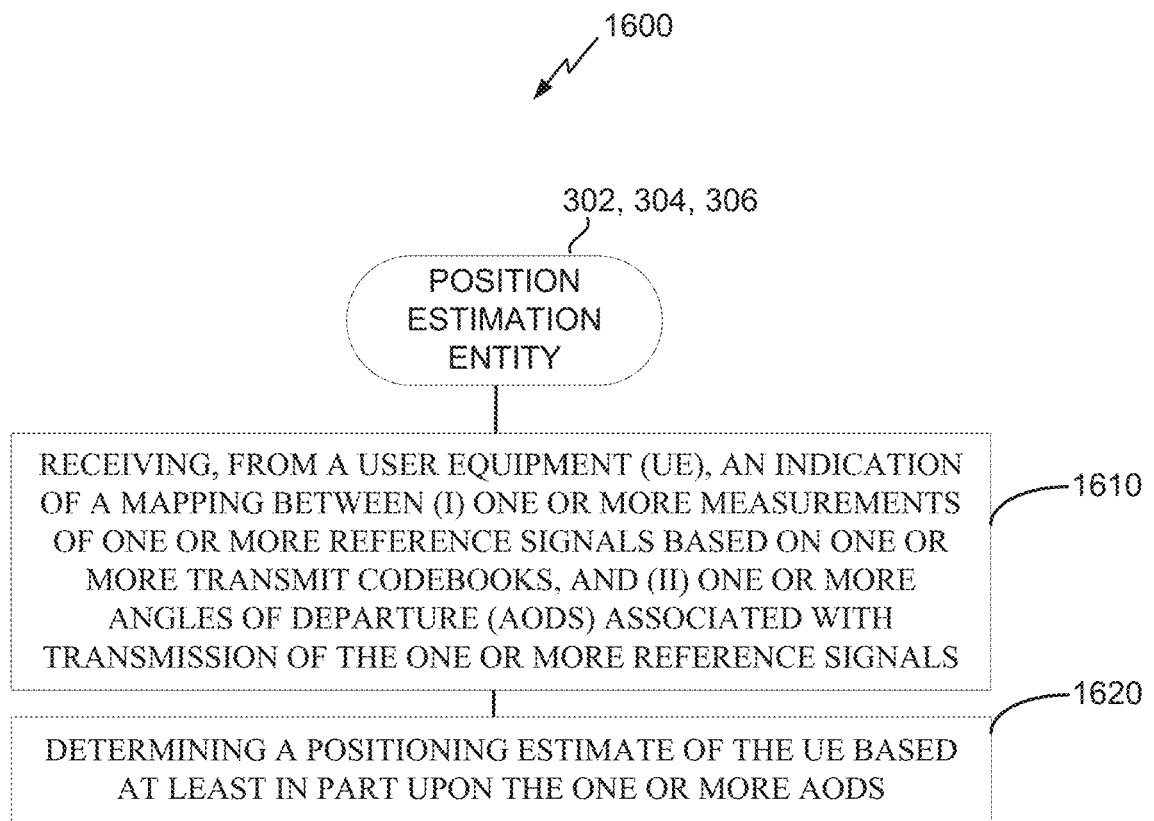

FIG. 16 illustrates an exemplary process 1600 of wireless communication, according to aspects of the disclosure. In an aspect, the process 1600 may be performed by a position estimation entity, such as UE 302, BS 304 (e.g., LMF integrated in RAN), a core network component such as network entity 306 (e.g., LMF, etc.), a location server, etc.

At 1610, UE 302 (e.g., receiver 312 or 322, data bus 334, etc.) receives, from a UE, an indication of a mapping between (i) one or more measurements of one or more reference signals based on one or more transmit codebooks, and (ii) one or more angles of departure (AoDs) associated with transmission of the one or more reference signals. In some designs, the position estimation entity may correspond to the UE (e.g., in which case the reception at 1610 is a logical transfer from one UE component to another over a data bus), another UE (e.g., via sidelink), a base station, a location management function (LMF), or a combination thereof. In some designs, the reception at 1610 may include indication(s) of the AoD(s) to which the measurement(s) are mapped.

At 1620, the position estimation entity (e.g., positioning component 342 or 388 or 398, processing system 332 or 384 or 394, etc.) determines a positioning estimate of the UE based at least in part upon the one or more AoDs.

Referring to FIGS. 15-16, in some designs, the mapping may be based upon a lookup table that is pre-configured based on field testing and/or dynamically configured (e.g., over time) based on crowd-sourcing, and may be specific to particular location region(s), particular TRP(s), particular beam(s), etc. For example, particular measurements or combinations of measurements can be correlated, in advance, with particular AoD value(s) or range(s). Then, instead of using a formula to dynamically calculate the AoD(s) based on the measurement values, the UE can instead refer to this table (or some other indication of the appropriate mapping) to map the reference signal measurement(s) to the respective AoD(s) or AoD range(s). For example, in field testing, test UEs under the control of a network operator may be maneuvered to different locations in a location region, where the test UEs perform measurements that can then be correlated with AoD(s) (e.g., using the legacy formulaic approach) at those respective locations. In another example, in addition to or in lieu of such field testing, UEs operated by subscribers may perform measurements during normal operation. Such measurements can be reported, or "crowd-sourced", and can likewise be correlated to AoD(s) (e.g., using the legacy formulaic approach) at those respective locations. Over time, these correlations (via crowd-sourcing from subscriber UEs or obtained from test UEs) can be used to generate (or refine) the above-noted mapping, which can then be used to reduce further AoD derivations using the legacy formulaic approach.

Referring to FIGS. 15-16, in some designs, the one or more reference signals include one or more sidelink (SL) reference signals (e.g., from another UE). In other designs, the one or more reference signals include one or more downlink (DL) signals (e.g., from a serving gNB or non-serving gNB).

Referring to FIGS. 15-16, in some designs, the mapping may be one of a plurality of mappings between different measurements associated with reception of the one or more reference signals and different respective one or more AoDs associated with transmission of the one or more reference signals. Consider an example where the mapping is implemented via a lookup table. Each entry in the table may be indexed to a particular measurement or combination of measurements, which are in turn associated with different respective AoD(s) or range of AoD(s).

Referring to FIGS. 15-16, in some designs, each measurement is derived using at least one or more PMIs associated with the one or more transmit codebooks and the one or more reference signals. As an example, one or more measurements may include indication(s) of one or more PMIs that maximize a received power of the reference signal on at least one path (e.g., an earliest path for positioning, or a highest received power path for communication). In a further example, the measurement(s) may include one or more relative RSRP measurements, one or more TOA measurements, or a combination thereof. In a specific example, the measurement(s) may include:

One or more PMIs, or

One or more PMIs and Relative RSRP(s), or

One or more PMIs and TOA measurement(s), or

One or more PMIs and Relative RSRP(s) and TOA measurement(s), or

A combination thereof

Referring to FIGS. 15-16, in some designs, the one or more AoDs to which the measurement(s) are mapped may include:

a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

In some designs, multiple AoDs or multiple ranges of AoDs can be indicated for scenarios where each AoD (or AoD range) is associated with a different path of the respective reference signal. More specifically, in an example, the multiple Azimuth AoDs, the multiple Zenith AoDs, the multiple Zenith and Azimuth AoDs, the multiple ranges of Azimuth AoDs, the multiple ranges of Zenith AoDs, and/or the multiple ranges Zenith and Azimuth AoDs may be associated with different multipaths of the one or more reference signals.

Referring to FIGS. 15-16, in some designs, the mapping may be configured the UE via unicast or broadcast location assistance data (e.g., a positioning SIB in the case of broadcast). For example, in the AoD lookup table example, the AoD lookup table (which may include any number of measurement-to-AoD mappings) may be included in the unicast or broadcast location assistance data. In some designs, the mapping (e.g., AoD lookup table) is transmitted to a location management function (LMF) via New Radio Positioning Protocol A (NRPPa) signaling. In this case, the indication received at 1610 need not include express reference to the AoD(s), but rather may include reference information (e.g., the measurement(s)) which the LMF can use to perform its own AoD mapping. In either case (e.g., express AoD reference or implicit AoD reference via LMF-implemented mapping), the LMF (or other position estimation entity) is able to determine the AoD(s) from the mapping indication.

Referring to FIGS. 15-16, in some designs, for some other reference signal measurement(s), the UE may implement formula-based AoD computation in lieu of mapping-based AoD lookup. For example, there may be scenarios where an insufficient amount of crowdsourcing and/or field testing has been performed to derive the measurement-to-AoD mappings, in which case the legacy formulaic approach can be used. In other scenarios, some but not all measurements (or measurement combinations) may have mappings. In this case, measurement(s) that do not fit a pre-defined mapping can instead be processed using the legacy formulaic approach. So, in the case of an AoD lookup table, some table entries may be associated with a mapping, while other table entries (or the lack of a matching table entry) may instruct the UE to implement the legacy formulaic approach for AoD derivation.

Referring to FIGS. 15-16, in some designs, the one or more reference signals may include an RS for positioning (RS-P) (e.g., DL-PRS(s), SL-PRS(s), etc.), a channel state indication (CSI)-RS, a synchronization signal block (SSB), a tracking RS (TRS), or a demodulation RS (DMRS).

Referring to FIGS. 15-16, in some designs, the UE may be configured with a codebook and to measure multiple RS ports. In an example, the UE may report the chosen PMIs (e.g., which maximize the energy on one or more desired paths) along with auxiliary information (e.g., RSRP, TOA, RSTD, Rx-Tx measurements, etc.). The LMF may not know how to map these into actual angles since the LMF may not know the beams/precoders used at the gNB. The gNB may be aware of those beams (which may be proprietary), and only sends the mappings (e.g., AoD lookup table) from the measurements to the angles. As noted above, a particular mapping may include a collection of PMIs mapped to an angle (or angle range). For example, this may correspond to the case of a UE reporting PMIs from a beam-combination codebook (e.g., Type-II type of codebook).

Referring to FIGS. 15-16, in some designs, the mapping may be determined so as to weight a first performance characteristic over a second performance characteristic. For example, the first performance characteristic may be associated with spectral efficiency of transmission (e.g., to pick a CQI for data communication), like in channel state information feedback (CSF), and the second performance characteristic may be associated with RSRP (e.g., maximization of RSRP) of an earliest path of signal transmission, and the one or more reference signals may be associated with communication of data (e.g., because spectral efficiency is prioritized). In another example, the second performance characteristic may be associated with spectral efficiency of transmission and the first performance characteristic is associated with RSRP of an earliest path of signal transmission, and the one or more reference signals may be associated with positioning of the UE (e.g., because the earliest path is prioritized). For example, different mappings can be configured off of the same measurement data. If the UE is performing positioning measurements, the UE will use the mapping associated with positioning, and if the UE is performing reference signal measurements to facilitate data communication, the UE will use the mapping associated with communication. In some designs, the different mappings can be distinguished via a differential angle value in the AoD lookup table in some designs (e.g., Angle #1 is indicated for positioning measurement, with Offset #1 to be applied to Angle #1 in case of communication measurement).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: receiving configuration of one or more reference signals to be measured; receiving configuration of one or more transmit codebooks associated with the reference signals to be measured; determining one or more measurements of the one or more reference signals based on the one or more transmit codebooks; determining a mapping between (i) the one or more measurements of the one or more reference signals and (ii) one or more angles of departure (AoDs) associated with transmission of the one or more reference signals; and transmitting an indication of the mapping to a position estimation entity.

Clause 2. The method of clause 1, wherein the mapping is based upon field testing performed in association with one or more test user equipments (UEs), or wherein the mapping is based upon crowd-sourcing in association with one or more UEs, or a combination thereof.

Clause 3. The method of any of clauses 1 to 2, wherein the position estimation entity corresponds to the UE, another UE, a base station, a location management function (LMF), or a combination thereof.

Clause 4. The method of any of clauses 1 to 3, wherein the one or more reference signals comprise one or more sidelink (SL) reference signals, or wherein the one or more reference signals comprise one or more downlink (DL) signals.

Clause 5. The method of any of clauses 1 to 4, wherein the mapping is one of a plurality of mappings between different measurements associated with reception of the one or more reference signals and different respective one or more AoDs associated with transmission of the one or more reference signals.

Clause 6. The method of any of clauses 1 to 5, wherein each measurement is derived using at least one or more Pre-coding Matrix Indicators (PMIs) associated with the one or more transmit codebooks and the one or more reference signals.

Clause 7. The method of any of clauses 1 to 6, wherein the one or more measurements include: one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

Clause 8. The method of any of clauses 1 to 7, wherein the one or more AoDs comprise: a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

Clause 9. The method of clause 8, wherein the multiple Azimuth AoDs, the multiple Zenith AoDs, the multiple Zenith and Azimuth AoDs, the multiple ranges of Azimuth AoDs, the multiple ranges of Zenith AoDs, and/or the multiple ranges Zenith and Azimuth AoDs are associated with different multipaths of the one or more reference signals.

Clause 10. The method of any of clauses 1 to 9, wherein the mapping is configured at the UE via unicast or broadcast location assistance data.

Clause 11. The method of any of clauses 1 to 10, wherein the mapping is transmitted to a location management function (LMF) via New Radio Positioning Protocol A (NRPPa) signaling.

Clause 12. The method of any of clauses 1 to 11, further comprising: performing, for one or more other reference signal measurements, formula-based AoD computation in lieu of mapping-based AoD lookup.

Clause 13. The method of any of clauses 1 to 12, wherein the one or more reference signals comprise a reference signal for positioning (RS-P), a channel state indication (CSI)-RS, a synchronization signal block (SSB), a tracking RS (TRS), or a demodulation RS (DMRS).

Clause 14. The method of clause 13, wherein the one or more reference signals comprise a downlink positioning reference signal (DL-PRS), or wherein the one or more reference signals comprise a sidelink positioning reference signal (SL-PRS).

Clause 15. The method of any of clauses 1 to 14, wherein the mapping is determined so as to weight a first performance characteristic over a second performance characteristic.

Clause 16. The method of clause 15, wherein the first performance characteristic is associated with spectral efficiency of transmission and the second performance characteristic is associated with a reference signal received power (RSRP) of an earliest path of signal transmission, and the one or more reference signals are associated with communication of data, or wherein the second performance characteristic is associated with spectral efficiency of transmission and the first performance characteristic is associated with a reference signal received power (RSRP) of an earliest path of signal transmission, and the one or more reference signals are associated with positioning of the UE.

Clause 17. The method of any of clauses 1 to 16, wherein the receiving of the configuration of the one or more transmit codebooks comprises receiving a transmit antenna configuration, and deriving the one or more transmit codebooks based on the transmit antenna configuration.

Clause 18. A method of operating a position estimation entity, comprising: receiving, from a user equipment (UE), an indication of a mapping between (i) one or more measurements of one or more reference signals based on one or more transmit codebooks, and (ii) one or more angles of departure (AoDs) associated with transmission of the one or more reference signals; and determining a positioning estimate of the UE based at least in part upon the one or more AoDs.

Clause 19. The method of clause 18, wherein the mapping is based upon field testing performed in association with one or more test user equipments (UEs), or wherein the mapping is based upon crowd-sourcing in association with one or more UEs, or a combination thereof.

Clause 20. The method of any of clauses 18 to 19, wherein the position estimation entity corresponds to the UE, another UE, a base station, a location management function (LMF), or a combination thereof.

Clause 21. The method of any of clauses 18 to 20, wherein the one or more reference signals comprise one or more sidelink (SL) reference signals, or wherein the one or more reference signals comprise one or more downlink (DL) signals.

Clause 22. The method of any of clauses 18 to 21, wherein the mapping is one of a plurality of mappings between different measurements associated with reception of the one or more reference signals and different respective one or more AoDs associated with transmission of the one or more reference signals.

Clause 23. The method of any of clauses 18 to 22, wherein each measurement is derived using at least one or more Pre-coding Matrix Indicators (PMIs) associated with the one or more transmit codebooks and the one or more reference signals.

Clause 24. The method of any of clauses 18 to 23, wherein the one or more measurements include: one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

Clause 25. The method of any of clauses 18 to 24, wherein the one or more AoDs comprise: a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

Clause 26. The method of any of clauses 18 to 25, wherein the mapping is configured at the UE via unicast or broadcast location assistance data.

Clause 27. The method of any of clauses 18 to 26, wherein the one or more signals comprise a reference signal for positioning (RS-P), a channel state indication (CSI)-

RS, a synchronization signal block (SSB), a tracking RS (TRS), or a demodulation RS (DMRS).

Clause 28. The method of clause 27, wherein the one or more reference signals comprise a downlink positioning reference signal (DL-PRS), or wherein the one or more reference signals comprise a sidelink positioning reference signal (SL-PRS).

Clause 29. An apparatus comprising a memory and at least one processor communicatively coupled to the memory, the memory and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:

receiving configuration of one or more reference signals to be measured;

receiving configuration of one or more transmit codebooks associated with the reference signals to be measured;

determining one or more measurements of the one or more reference signals based on the one or more transmit codebooks;

determining a mapping between (i) the one or more measurements of the one or more reference signals and (ii) one or more angles of departure (AoDs) associated with transmission of the one or more reference signals; and transmitting an indication of the mapping to a position estimation entity.

2. The method of claim 1, wherein the mapping is based upon field testing performed in association with one or more test user equipments (UEs), or wherein the mapping is based upon crowd-sourcing in association with one or more UEs, or a combination thereof.

3. The method of claim 1, wherein the position estimation entity corresponds to the UE, another UE, a base station, a location management function (LMF), or a combination thereof.

4. The method of claim 1, wherein the one or more reference signals comprise one or more sidelink (SL) reference signals, or wherein the one or more reference signals comprise one or more downlink (DL) signals.

5. The method of claim 1, wherein the mapping is one of a plurality of mappings between different measurements associated with reception of the one or more reference signals and different respective one or more AoDs associated with transmission of the one or more reference signals.

6. The method of claim 1, wherein each measurement is derived using at least one or more Pre-coding Matrix Indicators (PMIs) associated with the one or more transmit codebooks and the one or more reference signals.

7. The method of claim 1, wherein the one or more measurements include:

one or more Pre-coding Matrix Indicators (PMIs) that maximize a received power of the reference signal on at least one path, or one or more relative reference signal received power (RSRP) measurements, or one or more time of arrival (TOA) measurements, or a combination thereof.

8. The method of claim 1, wherein the one or more AoDs comprise:

a single Azimuth AoD or a single range of Azimuth AoDs, or multiple Azimuth AoDs or multiple ranges of Azimuth AoDs, or a single Zenith AoD or a single range of Zenith AoDs, or multiple Zenith AoDs or multiple ranges of Zenith AoDs, or a single Zenith and Azimuth AoD or a single range of Zenith and Azimuth AoDs, or multiple Zenith and Azimuth AoDs or multiple ranges of Zenith and Azimuth AoDs, or a combination thereof.

9. The method of claim 8, wherein the multiple Azimuth AoDs, the multiple Zenith AoDs, the multiple Zenith and Azimuth AoDs, the multiple ranges of Azimuth AoDs, the multiple ranges of Zenith AoDs, and/or the multiple ranges Zenith and Azimuth AoDs are associated with different multipaths of the one or more reference signals.

10. The method of claim 1, wherein the mapping is configured at the UE via unicast or broadcast location assistance data.

11. The method of claim 1, wherein the mapping is transmitted to a location management function (LMF) via New Radio Positioning Protocol A (NRPPa) signaling.

12. The method of claim 1, further comprising:

performing, for one or more other reference signal measurements, formula-based AoD computation in lieu of mapping-based AoD lookup.

13. The method of claim 1, wherein the one or more reference signals comprise a reference signal for positioning (RS-P), a channel state indication (CSI)-RS, a synchronization signal block (SSB), a tracking RS (TRS), or a demodulation RS (DMRS).

14. The method of claim 13,
wherein the one or more reference signals comprise a downlink positioning reference signal (DL-PRS), or
wherein the one or more reference signals comprise a sidelink positioning reference signal (SL-PRS).

15. The method of claim 1, wherein the mapping is determined so as to weight a first performance characteristic over a second performance characteristic.

16. The method of claim 15,
wherein the first performance characteristic is associated with spectral efficiency of transmission and the second performance characteristic is associated with a reference signal received power (RSRP) of an earliest path of signal transmission, and the one or more reference signals are associated with communication of data, or
wherein the second performance characteristic is associated with spectral efficiency of transmission and the first performance characteristic is associated with a reference signal received power (RSRP) of an earliest path of signal transmission, and the one or more reference signals are associated with positioning of the UE.

17. The method of claim 1, wherein the receiving of the configuration of the one or more transmit codebooks comprises receiving a transmit antenna configuration, and deriving the one or more transmit codebooks based on the transmit antenna configuration.

18. A method of operating a position estimation entity, comprising:
receiving, from a user equipment (UE), an indication of a mapping between (i) one or more measurements of one or more reference signals based on one or more transmit codebooks, and (ii) one or more angles of departure (AoDs) associated with transmission of the one or more reference signals; and
determining a positioning estimate of the UE based at least in part upon the one or more AoDs.

19. The method of claim 18,
wherein the mapping is based upon field testing performed in association with one or more test user equipments (UEs), or
wherein the mapping is based upon crowd-sourcing in association with one or more UEs, or
a combination thereof.

20. The method of claim 18, wherein the position estimation entity corresponds to the UE, another UE, a base station, a location management function (LMF), or a combination thereof.

21. The method of claim 18,
wherein the one or more reference signals comprise one or more sidelink (SL) reference signals, or
wherein the one or more reference signals comprise one or more downlink (DL) signals.

22. The method of claim 18, wherein the mapping is one of a plurality of mappings between different measurements associated with reception of the one or more reference signals and different respective one or more AoDs associated with transmission of the one or more reference signals.

23. The method of claim 18, wherein each measurement is derived using at least one or more Pre-coding Matrix Indicators (PMIs) associated with the one or more transmit codebooks and the one or more reference signals.

24. The method of claim 18, wherein the one or more measurements include:
one or more Pre-coding Matrix Indicators (PMIs) that maximize a received power of the reference signal on at least one path, or
one or more relative reference signal received power (RSRP) measurements, or
one or more time of arrival (TOA) measurements, or
a combination thereof.

25. The method of claim 18, wherein the one or more AoDs comprise:
a single Azimuth AoD or a single range of Azimuth AoDs, or
multiple Azimuth AoDs or multiple ranges of Azimuth AoDs, or
a single Zenith AoD or a single range of Zenith AoDs, or
multiple Zenith AoDs or multiple ranges of Zenith AoDs, or
a single Zenith and Azimuth AoD or a single range of Zenith and Azimuth AoDs, or
multiple Zenith and Azimuth AoDs or multiple ranges of Zenith and Azimuth AoDs, or
a combination thereof.

26. The method of claim 18, wherein the mapping is configured at the UE via unicast or broadcast location assistance data.

27. The method of claim 18, wherein the one or more signals comprise a reference signal for positioning (RS-P), a channel state indication (CSI)-RS, a synchronization signal block (SSB), a tracking RS (TRS), or a demodulation RS (DMRS).

28. The method of claim 27,
wherein the one or more reference signals comprise a downlink positioning reference signal (DL-PRS), or
wherein the one or more reference signals comprise a sidelink positioning reference signal (SL-PRS).

29. A user equipment (UE), comprising:
a memory;
at least one transceiver; and
at least one processor communicatively coupled to the memory and the at least one transceiver, the at least one processor configured to:
receive configuration of one or more reference signals to be measured;
receive configuration of one or more transmit codebooks associated with the reference signals to be measured;
determine one or more measurements of the one or more reference signals based on the one or more transmit codebooks;
determine a mapping between (i) the one or more measurements of the one or more reference signals and (ii) one or more angles of departure (AoDs) associated with transmission of the one or more reference signals; and
transmit an indication of the mapping to a position estimation entity.

30. The UE of claim 29,
wherein the one or more reference signals comprise one or more sidelink (SL) reference signals, or
wherein the one or more reference signals comprise one or more downlink (DL) signals.

31. The UE of claim 29, wherein the one or more measurements include:
one or more Pre-coding Matrix Indicators (PMIs) that maximize a received power of the reference signal on at least one path, or
one or more relative reference signal received power (RSRP) measurements, or one or more time of arrival (TOA) measurements, or a combination thereof.

32. The UE of claim 29, wherein the one or more AoDs comprise:
a single Azimuth AoD or a single range of Azimuth AoDs, or
multiple Azimuth AoDs or multiple ranges of Azimuth AoDs, or
a single Zenith AoD or a single range of Zenith AoDs, or
multiple Zenith AoDs or multiple ranges of Zenith AoDs, or
a single Zenith and Azimuth AoD or a single range of Zenith and Azimuth AoDs, or
multiple Zenith and Azimuth AoDs or multiple ranges of Zenith and Azimuth AoDs, or
a combination thereof.

33. The UE of claim 29, wherein the one or more reference signals comprise a reference signal for positioning (RS-P), a channel state indication (CSI)-RS, a synchronization signal block (SSB), a tracking RS (TRS), or a demodulation RS (DMRS).

34. A position estimation entity, comprising:
a memory;
at least one transceiver; and
at least one processor communicatively coupled to the memory and the at least one transceiver, the at least one processor configured to:
receive, from a user equipment (UE), an indication of a mapping between (i) one or more measurements of one or more reference signals based on one or more transmit codebooks, and (ii) one or more angles of departure (AoDs) associated with transmission of the one or more reference signals; and
determine a positioning estimate of the UE based at least in part upon the one or more AoDs.

35. The position estimation entity of claim 34,
wherein the one or more reference signals comprise one or more sidelink (SL) reference signals, or
wherein the one or more reference signals comprise one or more downlink (DL) signals.

36. The position estimation entity of claim 34, wherein the one or more measurements include:
one or more Pre-coding Matrix Indicators (PMIs) that maximize a received power of the reference signal on at least one path, or
one or more relative reference signal received power (RSRP) measurements, or
one or more time of arrival (TOA) measurements, or
a combination thereof.

37. The position estimation entity of claim 34, wherein the one or more AoDs comprise:
a single Azimuth AoD or a single range of Azimuth AoDs, or
multiple Azimuth AoDs or multiple ranges of Azimuth AoDs, or
a single Zenith AoD or a single range of Zenith AoDs, or
multiple Zenith AoDs or multiple ranges of Zenith AoDs, or
a single Zenith and Azimuth AoD or a single range of Zenith and Azimuth AoDs, or
multiple Zenith and Azimuth AoDs or multiple ranges of Zenith and Azimuth AoDs, or
a combination thereof.

38. The position estimation entity of claim 34, wherein the one or more reference signals comprise a reference signal for positioning (RS-P), a channel state indication (CSI)-RS, a synchronization signal block (SSB), a tracking RS (TRS), or a demodulation RS (DMRS).

* * * * *